(12) United States Patent
Iwamoto et al.

(10) Patent No.: US 8,071,237 B2
(45) Date of Patent: Dec. 6, 2011

(54) NEGATIVE ELECTRODE ACTIVE MATERIAL AND NEGATIVE ELECTRODE USING THE SAME AND LITHIUM ION SECONDARY BATTERY

(75) Inventors: Kazuya Iwamoto, Osaka (JP); Shuji Ito, Nara (JP)

(73) Assignee: Panasonic Corporation, Osaka (JP)

( * ) Notice: Subject to any disclaimer, the term of this patent is extended or adjusted under 35 U.S.C. 154(b) by 814 days.

(21) Appl. No.: 12/095,879
(22) PCT Filed: Nov. 24, 2006
(86) PCT No.: PCT/JP2006/323403
§ 371 (c)(1),
(2), (4) Date: Jun. 2, 2008
(87) PCT Pub. No.: WO2007/063765
PCT Pub. Date: Jun. 7, 2007

(65) Prior Publication Data
US 2009/0047577 A1 Feb. 19, 2009

(30) Foreign Application Priority Data
Dec. 2, 2005 (JP) .................. 2005-349841

(51) Int. Cl.
*H01M 4/13* (2010.01)
*H01M 4/48* (2010.01)
*H01M 10/02* (2006.01)
*C01B 33/113* (2006.01)
*B05D 5/12* (2006.01)
*C23C 16/00* (2006.01)

(52) U.S. Cl. .................. 429/218.1; 423/325; 427/126.3; 427/255.28

(58) Field of Classification Search ............... 429/218.1, 429/218.2, 209, 231.9, 231.95; 252/182.1; 427/78, 126.3, 255.28; 423/325; 29/623.1
See application file for complete search history.

(56) References Cited

U.S. PATENT DOCUMENTS
2005/0048369 A1   3/2005 Koshina et al.
(Continued)

FOREIGN PATENT DOCUMENTS
EP    0 582 173 A1    2/1994
(Continued)

OTHER PUBLICATIONS

"Kinetics of amorphous silica dissolution and the paradox of the silica polymorphs", Dove et al., Proceedings of the National Academy of Sciences of the United States of America, vol. 105, No. 29, p. 9903-9908, Jul. 22, 2008.*

(Continued)

*Primary Examiner* — Jonathan Crepeau
*Assistant Examiner* — Kenneth Douyette
(74) *Attorney, Agent, or Firm* — McDermott Will & Emery LLP

(57) ABSTRACT

In a negative electrode active material for a lithium ion secondary battery including a silicon oxide capable of absorbing and desorbing lithium ions, a silicon oxide having structural units each in the form of a tetrahedron in which a silicon atom is located at its center and silicon or oxygen atoms are located at its four vertices is used. The structural units are arranged randomly to form an amorphous structure. In the case that the number of oxygen atoms located at the four vertices in the structural units is represented by n (n=0, 1, 2, 3 or 4) and the structural units are represented by Si(n), the number of the structural units NSi(n) in the silicon oxide satisfies the following relations (1) to (3).

[Formula 1]

$$\frac{NSi(0)}{\sum NSi(n)} \geq 0.1 \quad (1)$$

$$\frac{Nsi(4)}{\sum NSi(n)} \leq 0.1 \quad (2)$$

$$Nsi(1) + NSi(2) + NSi(3) \neq 0 \quad (3)$$

8 Claims, 19 Drawing Sheets

U.S. PATENT DOCUMENTS

2005/0233213 A1    10/2005    Lee et al.

FOREIGN PATENT DOCUMENTS

| | | |
|---|---|---|
| EP | 1 511 100 A2 | 3/2005 |
| JP | 6-325765 | 11/1994 |
| JP | 2001-185127 | 7/2001 |
| JP | 2002-83594 | 3/2002 |
| JP | 2004-71542 | 3/2004 |
| JP | 2005-100959 A | 4/2005 |
| JP | 2005-183264 | 7/2005 |
| JP | 2006-196447 | 7/2006 |
| JP | 2007-35297 | 2/2007 |

OTHER PUBLICATIONS

"Coating Materials", Martin Friz and Friedrich Waibel, Merck KGaA and Umicore Materials AG, Technical Publication, p. 121-122, Jun. 12, 2003.*

"Silicon Monoxide SiO Additional Resources", Materion Advanced Chemicals, Milwaukee, WI, P1. Obtained online on Sep. 7, 2011 from: http://www.materion.com.*

J. Yang et al., "SiOx-based anodes for secondary lithium batteries," Solid State Ionics, vol. 152-153, 2002, pp. 125-129, XP004398218.

European Search Report issued in Patent Application No. 06833207.1-2119 dated Nov. 27, 2008.

Huggins, R., "Lithium alloy negative electrodes formed from convertible oxides", Solid State Ionics, 1998, pp. 57-67, 113-115, Elsevier Science B.V.

Miyachi, M., et al., "Analysis of SiO Anodes for Lithium-Ion Batteries", Journal of The Electrochemical Society, 2005, pp. A2089-A2091, 152 (10), The Electrochemical Society Inc.

Friede, B., et al., Letter to the Editor Some comments on so-called 'silicon monoxide', Journal of Non-Crystalline Solids, 1996, pp. 202-203, Elsevier Science B.V.

Hohl, A., et al., "An interface clusters mixture mode for the structure of amorphous silicon monoxide (SiO)", Journal of Non-Crystalline Solids, 2003, pp. 255-280, 320, Elsevier Science B.V.

* cited by examiner

[FIG. 1]
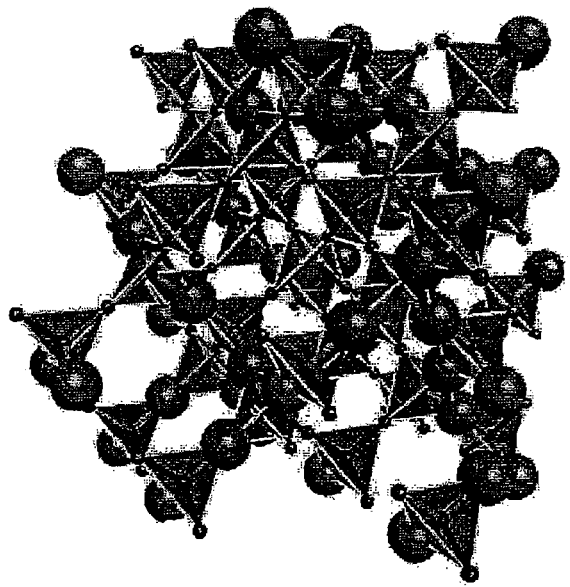
[FIG. 2]
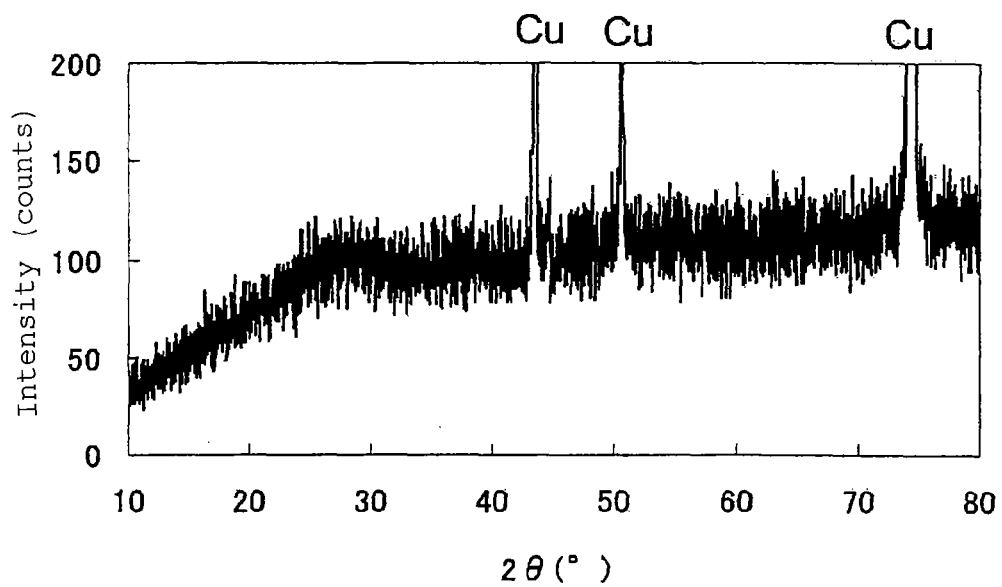

[FIG. 3]
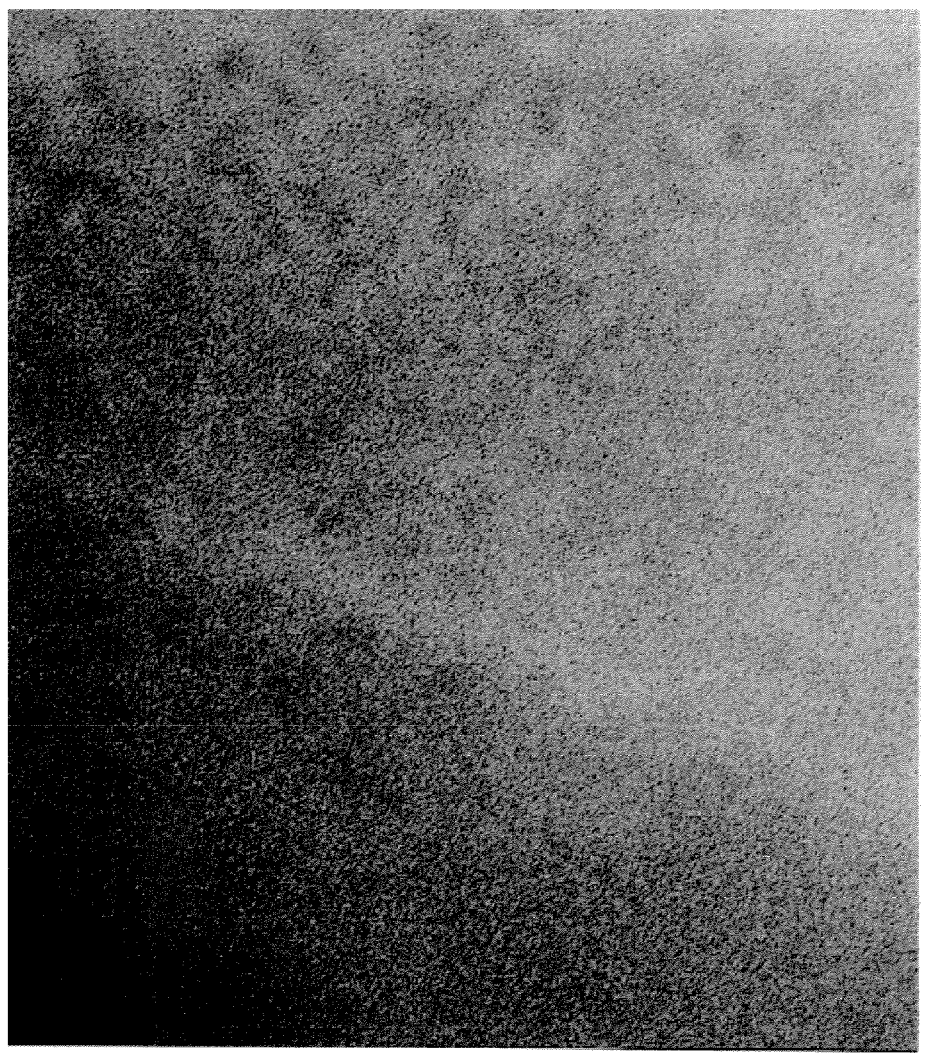
10 nm

[FIG. 4]
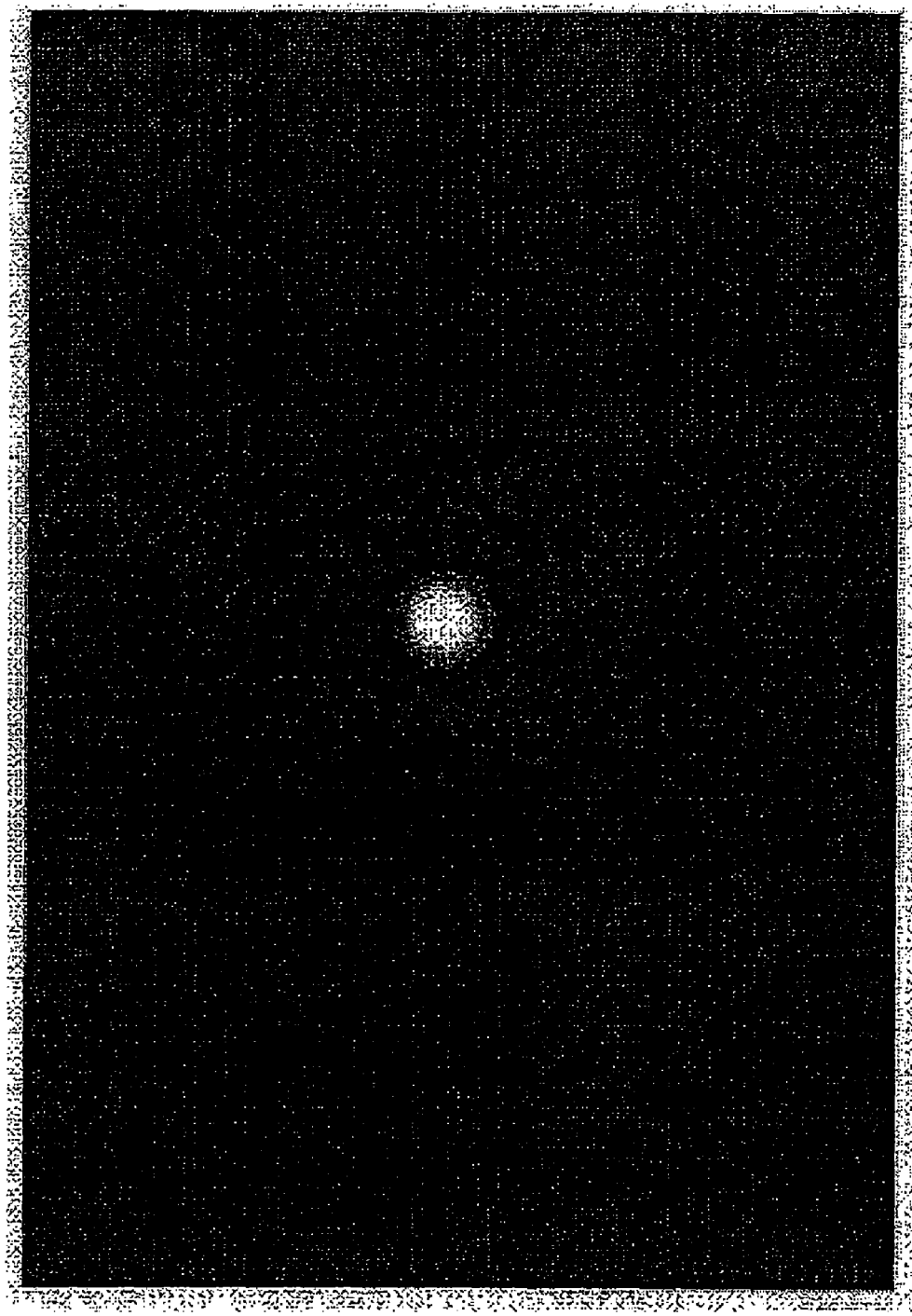

[FIG. 5]
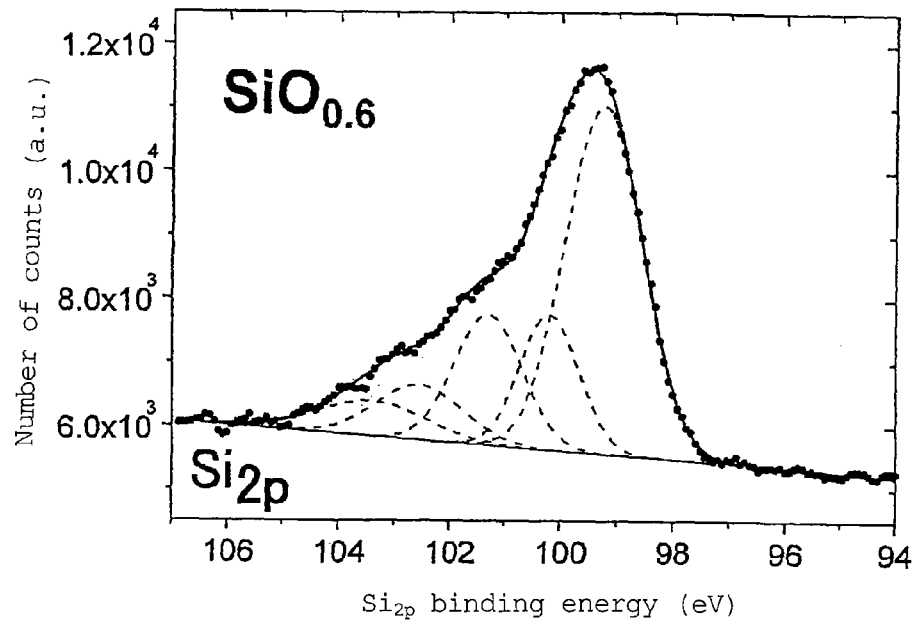
[FIG. 6]
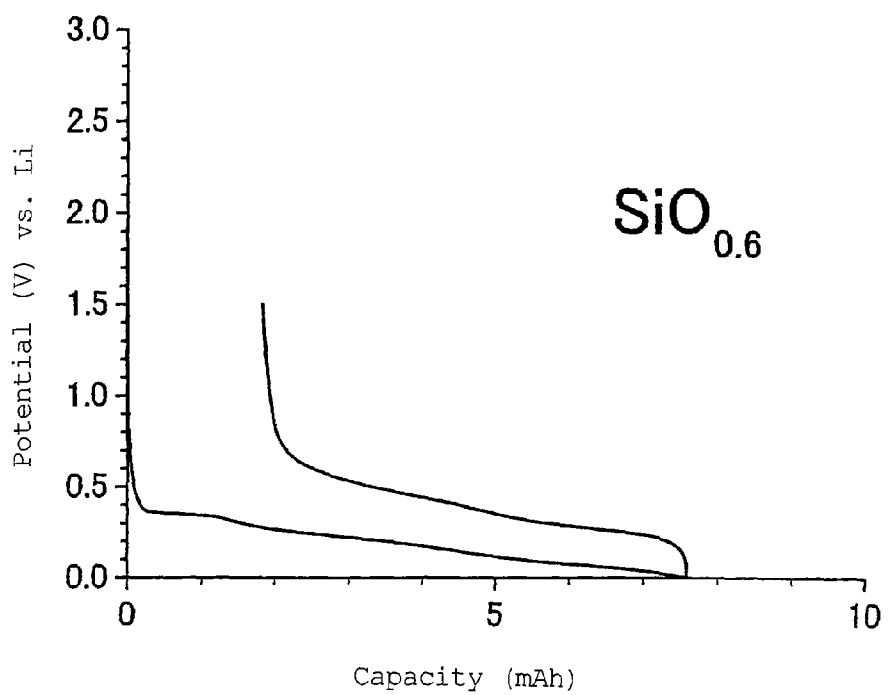

[FIG. 7]
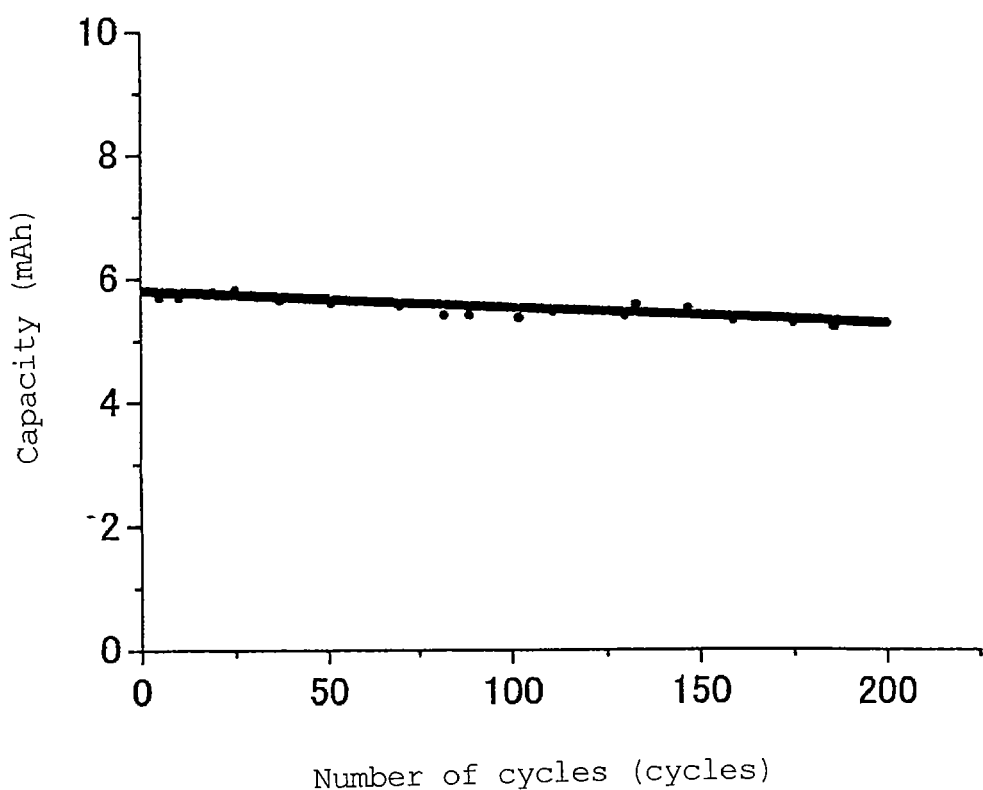

[FIG. 8]
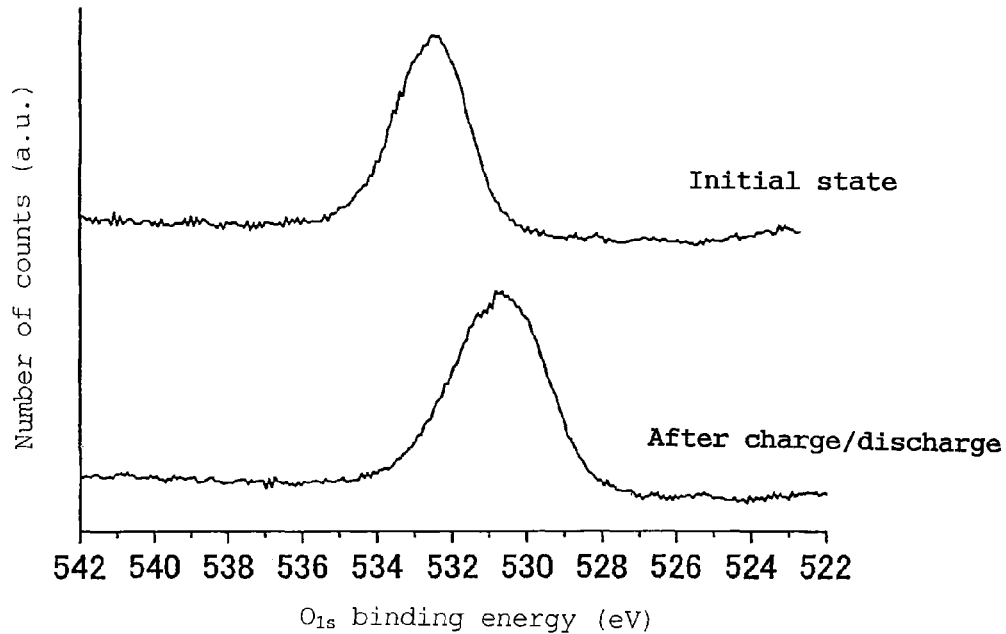
[FIG. 9]
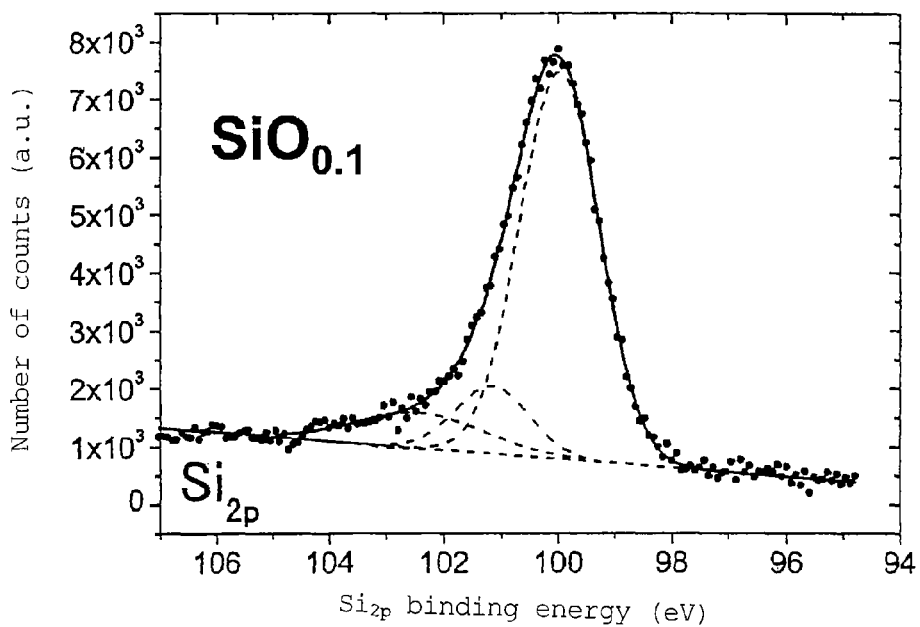

[FIG. 10]
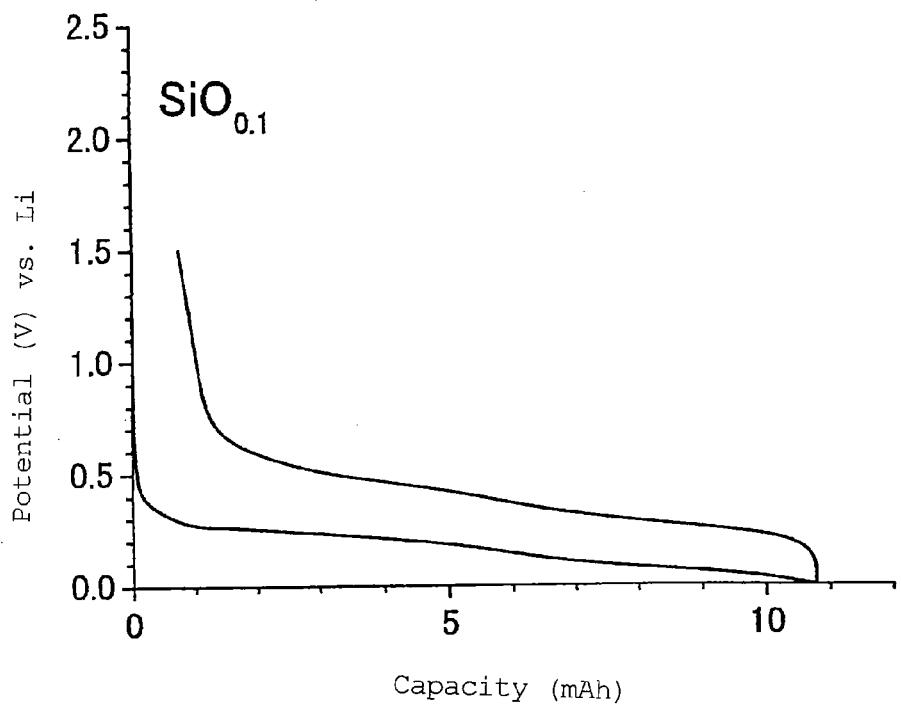
[FIG. 11]
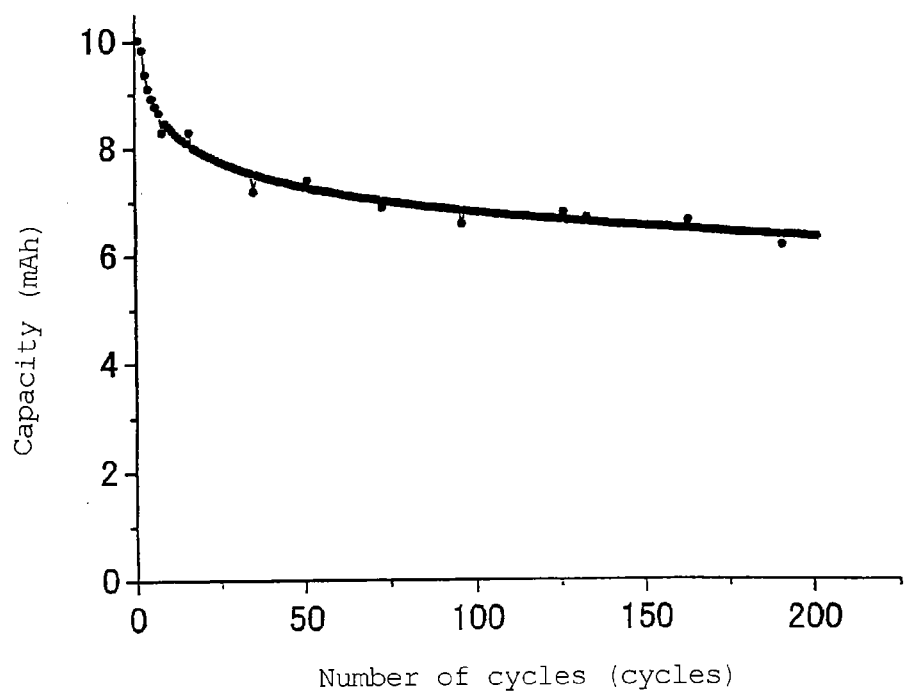

[FIG. 12]
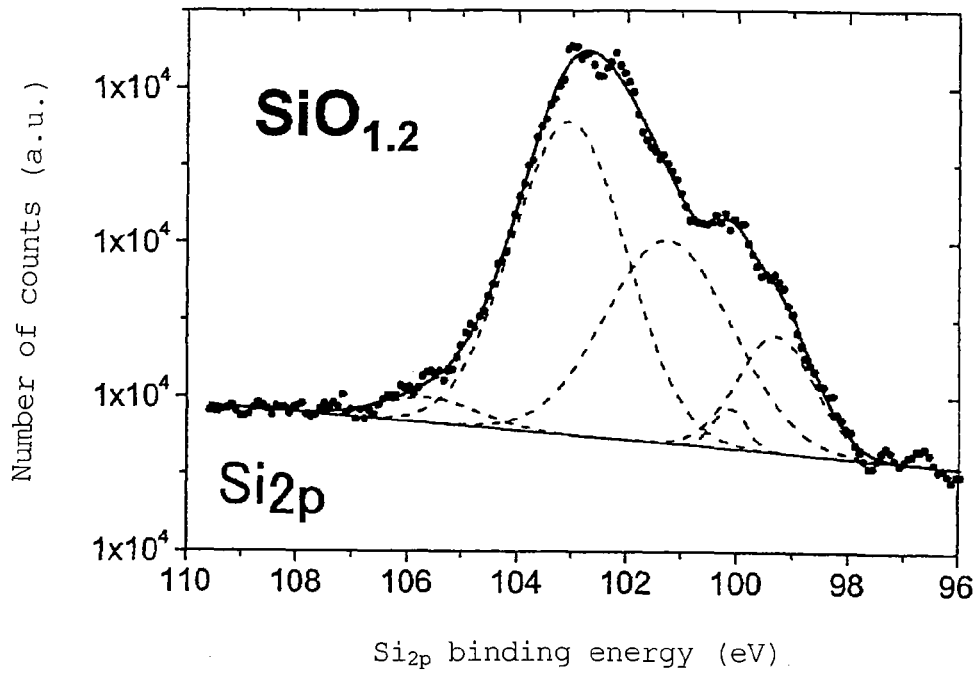
[FIG. 13]
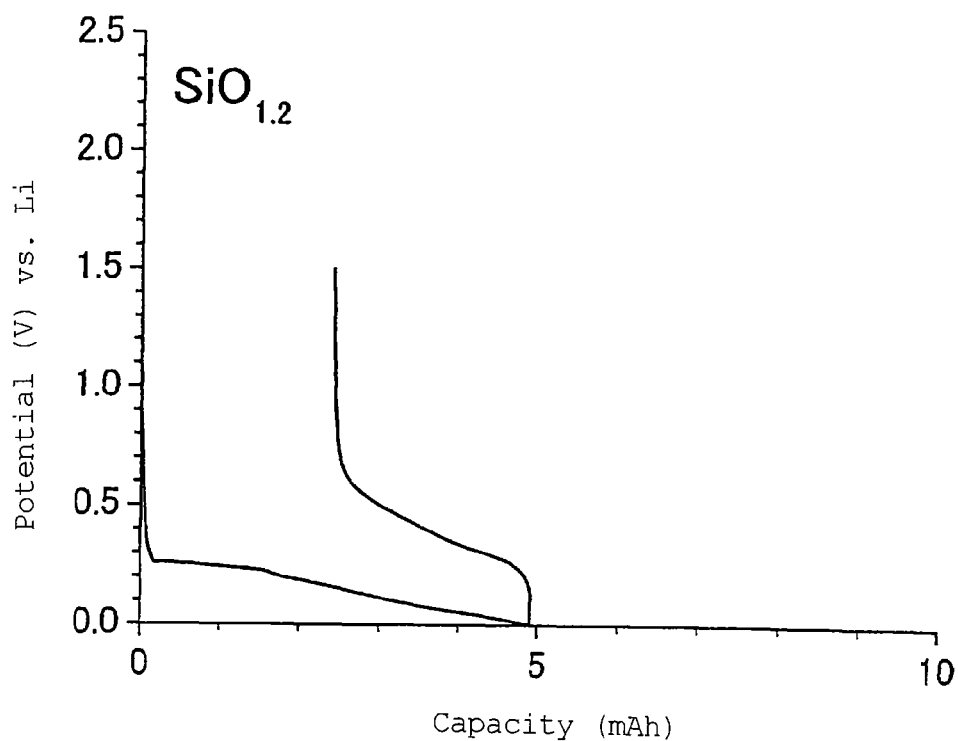

[FIG. 14]
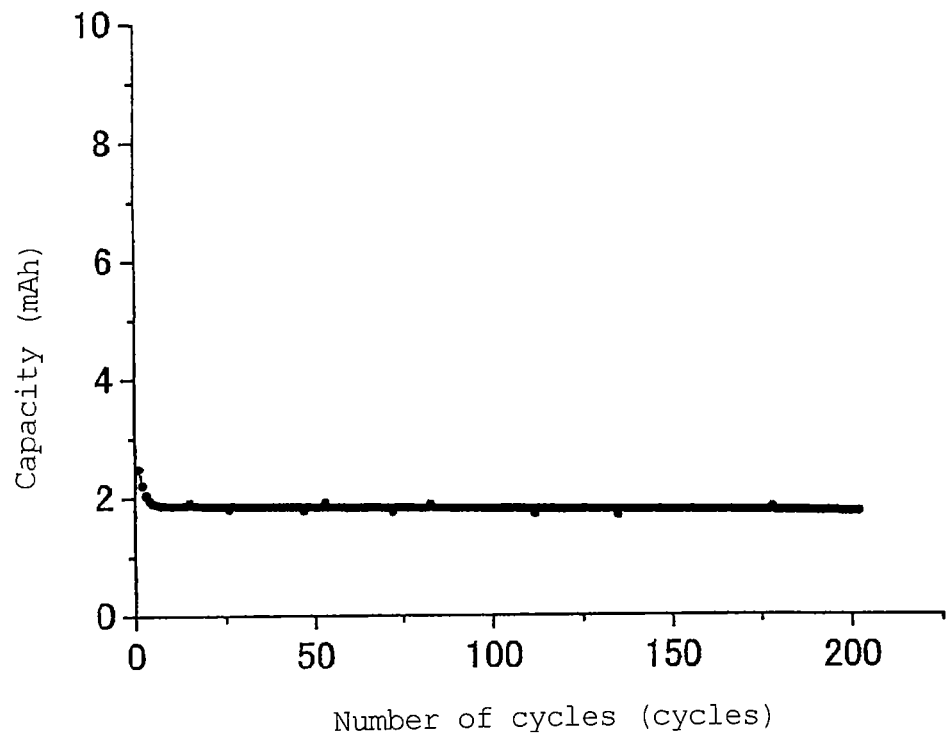
[FIG. 15]
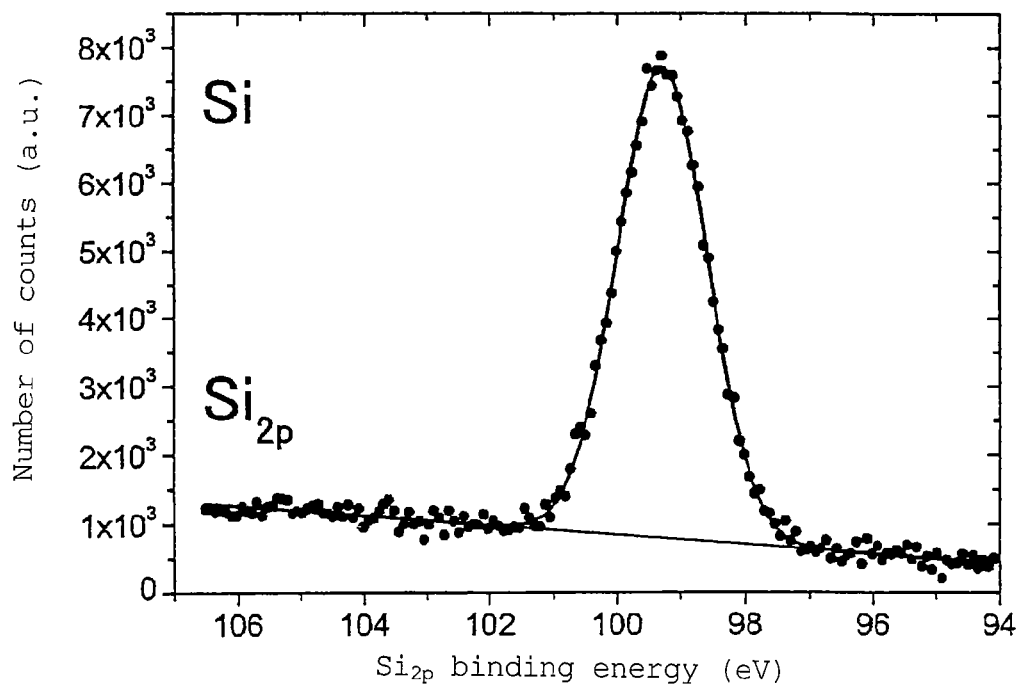

[FIG. 16]
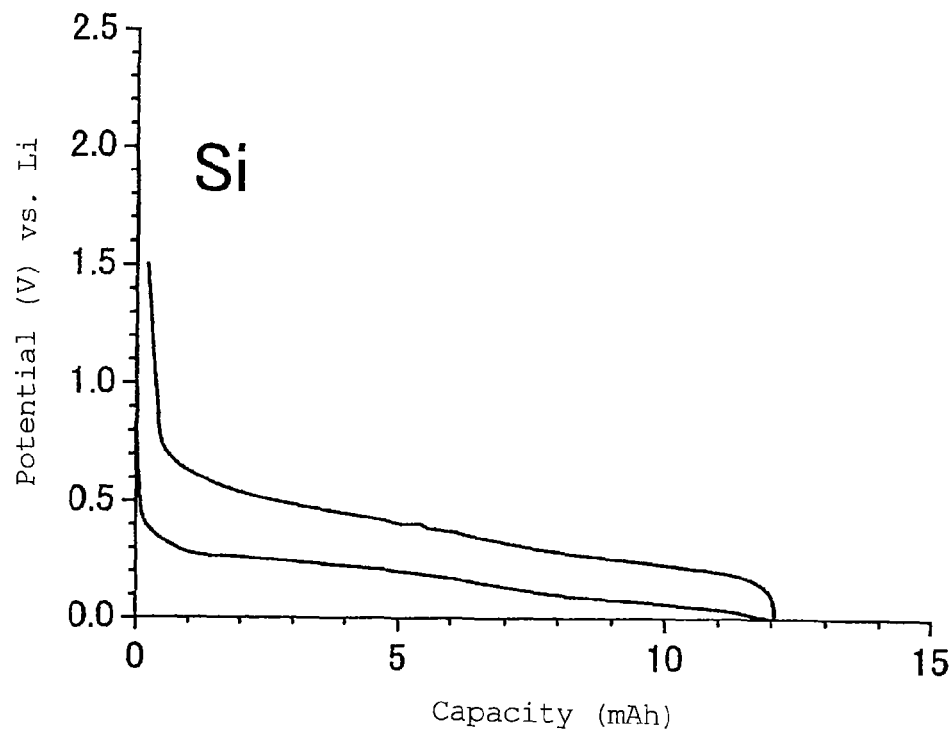
[FIG. 17]
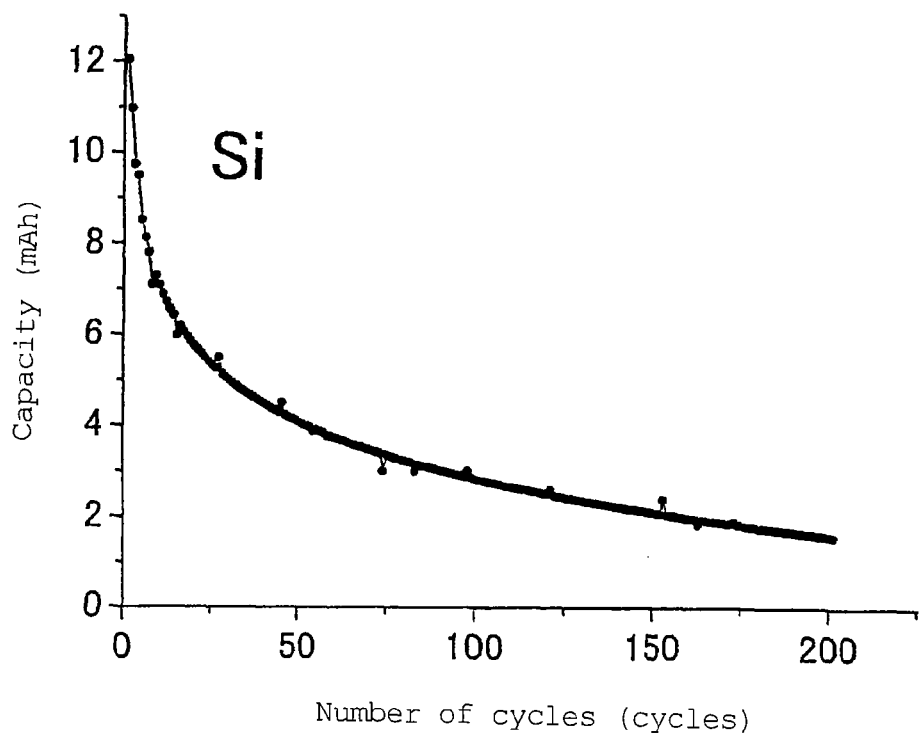

[FIG. 18]
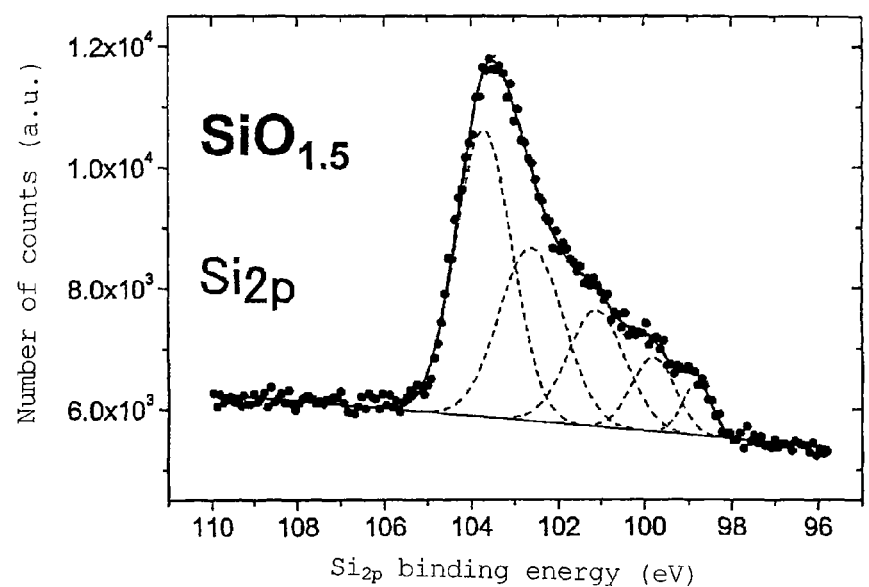
[FIG. 19]
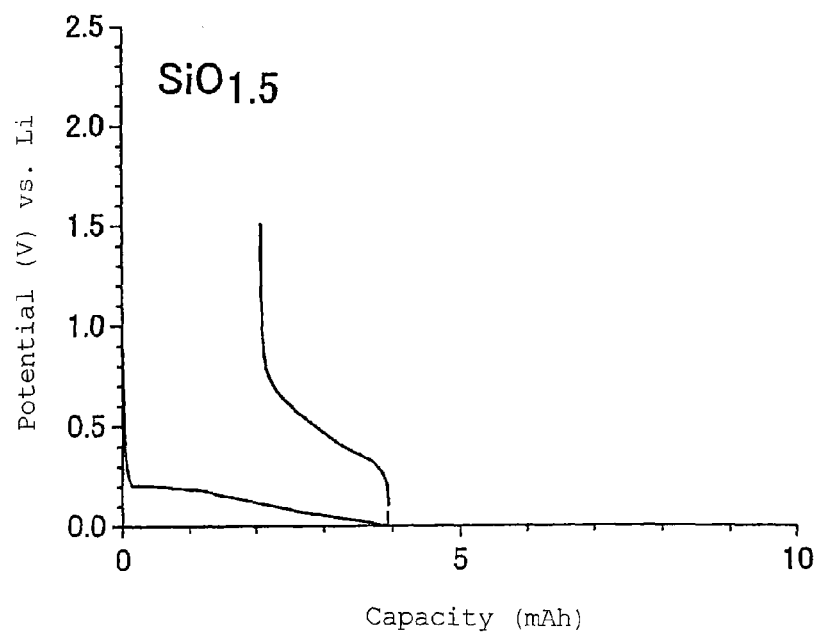

[FIG. 20]
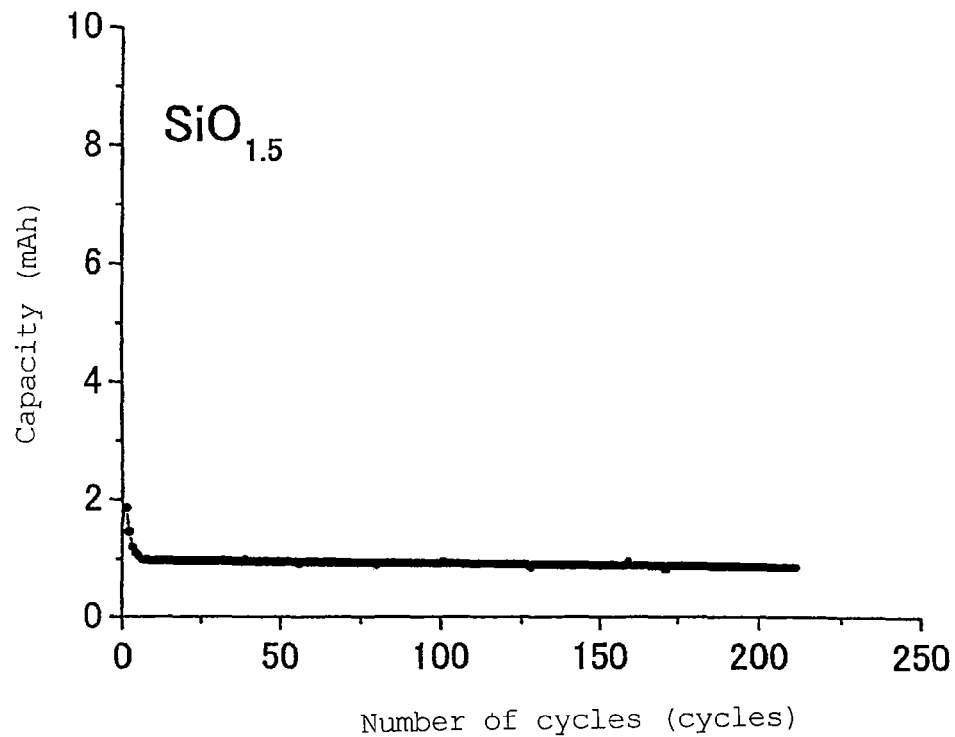
[FIG. 21]
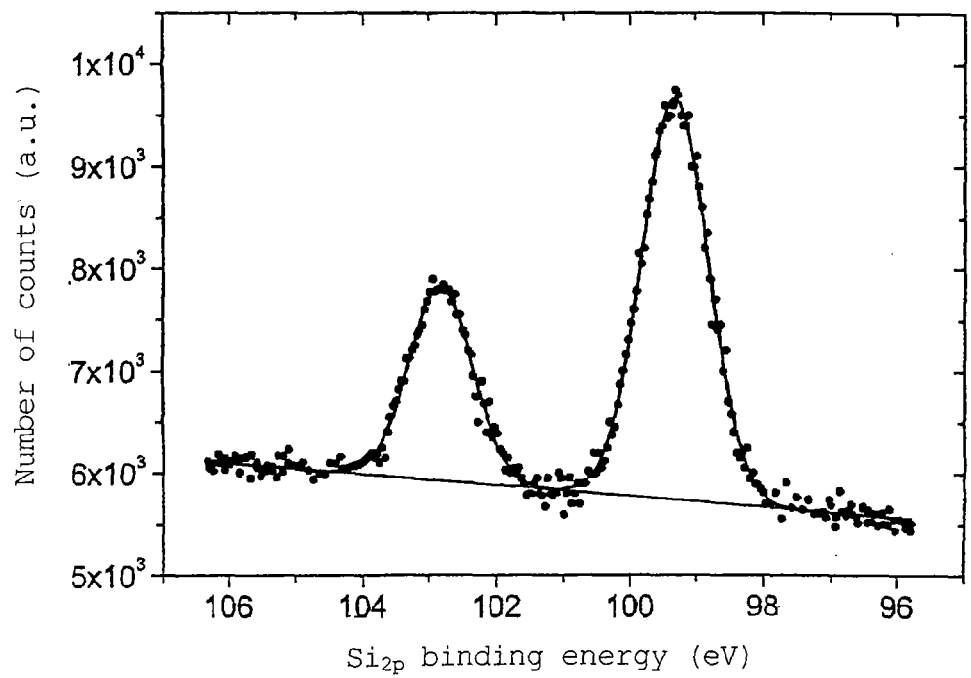

[FIG. 22]
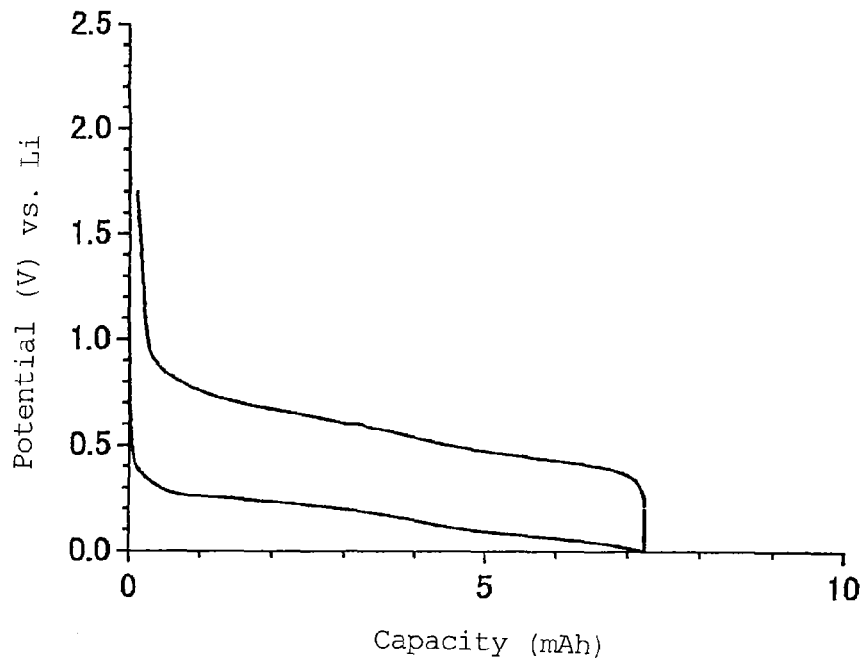
[FIG. 23]
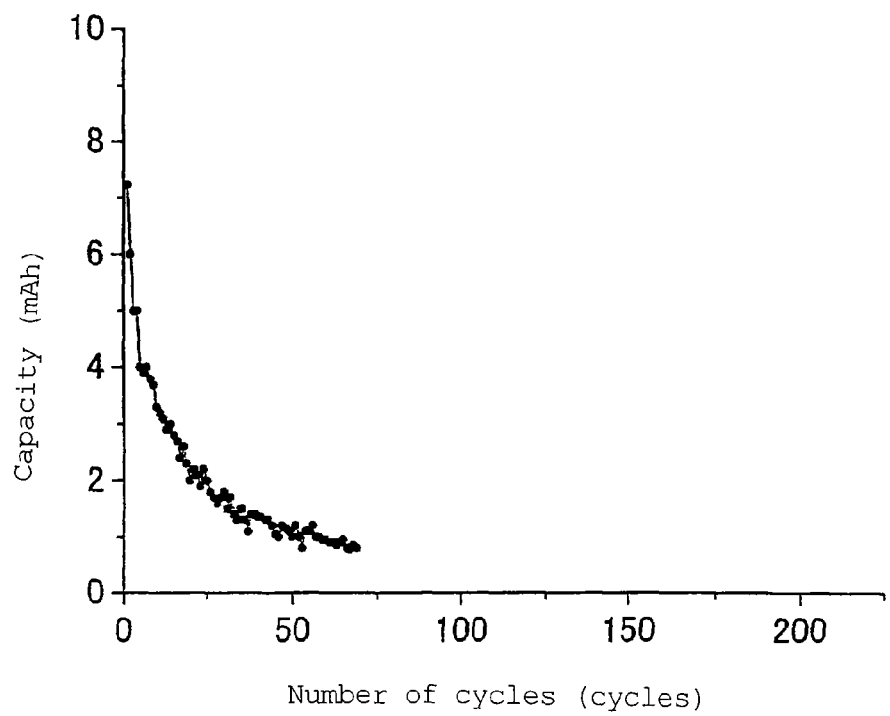

[FIG. 24]
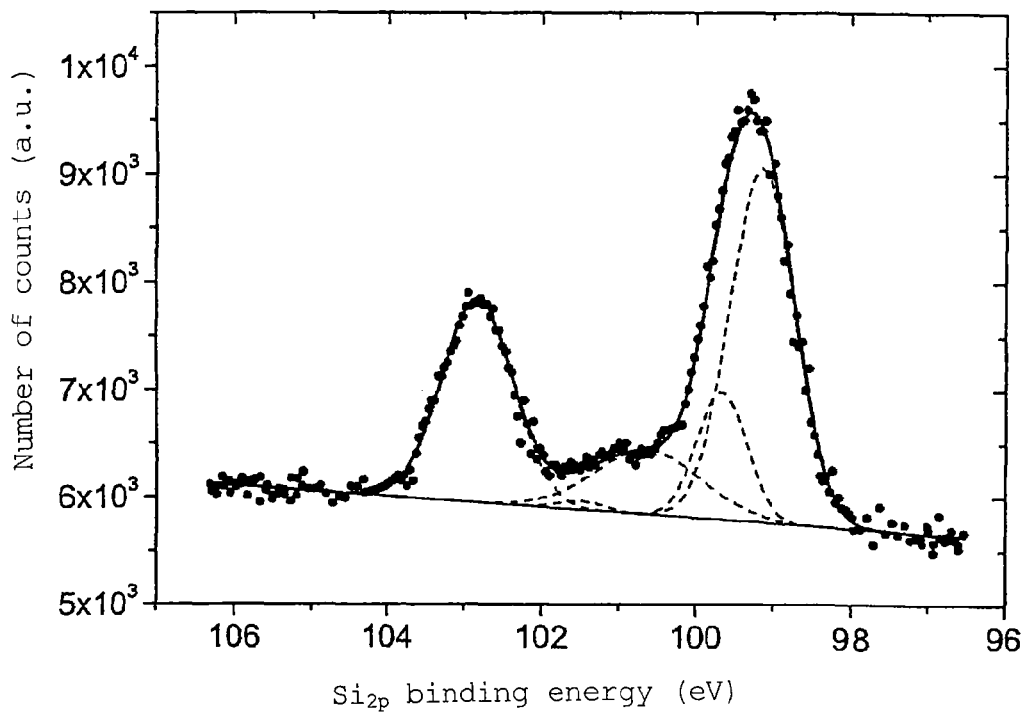
[FIG. 25]
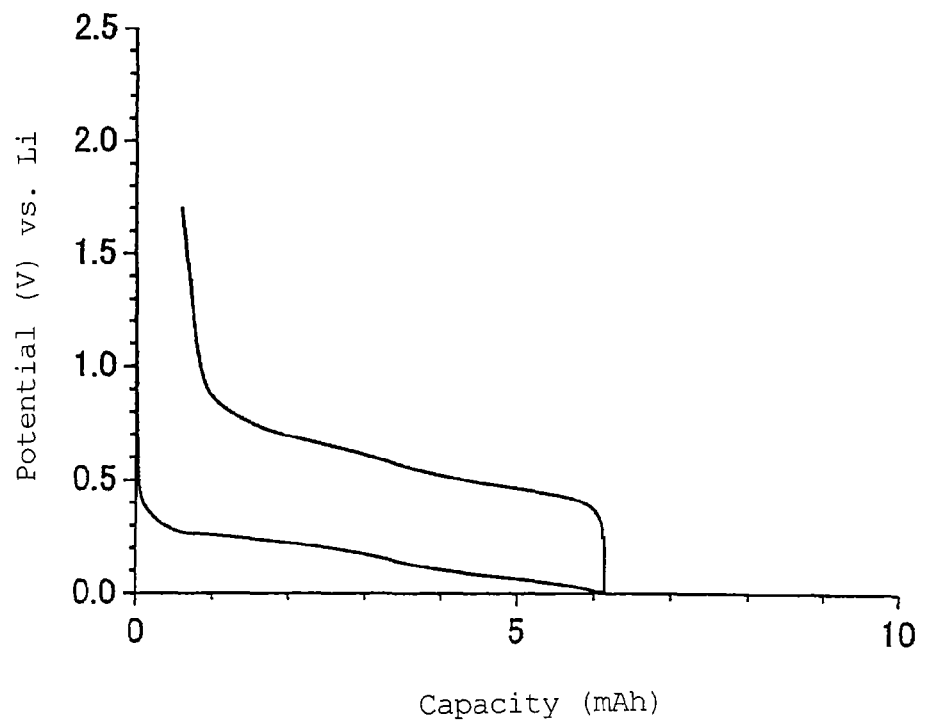

[FIG. 26]
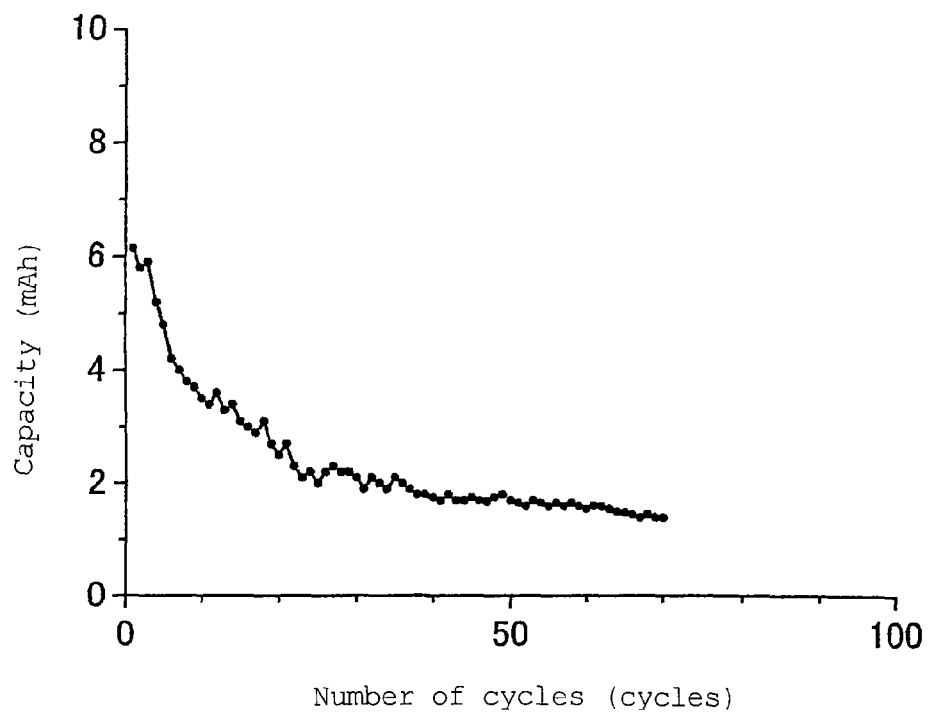
[FIG. 27]
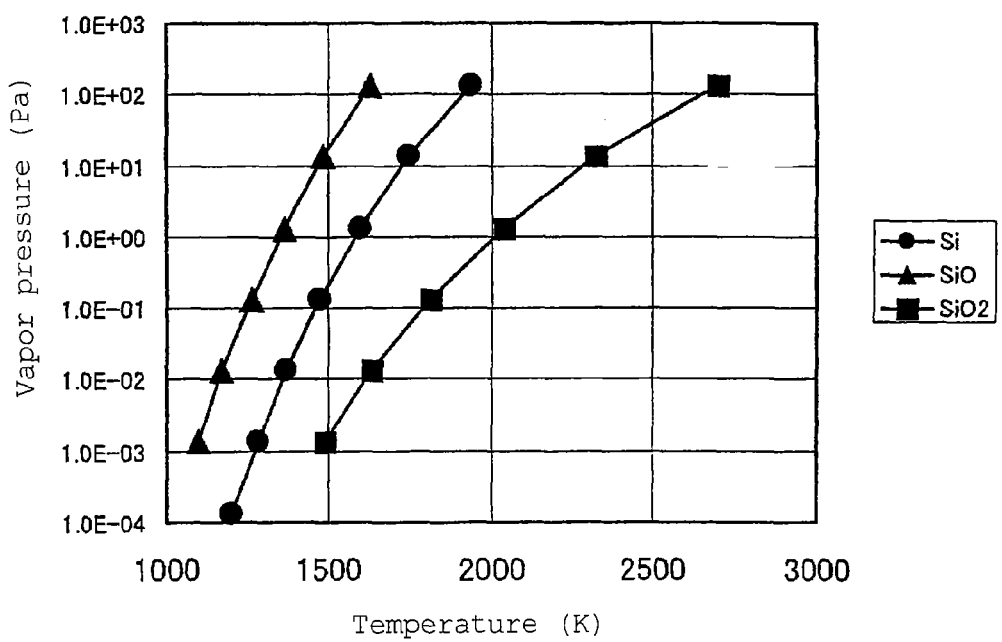

[FIG. 28]
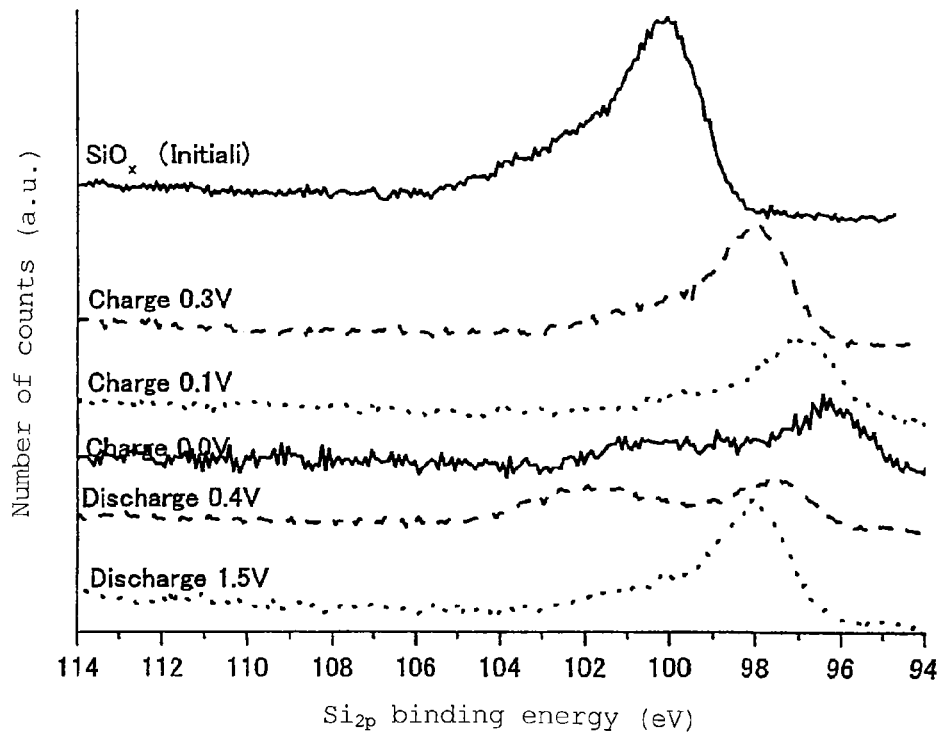
[FIG. 29]
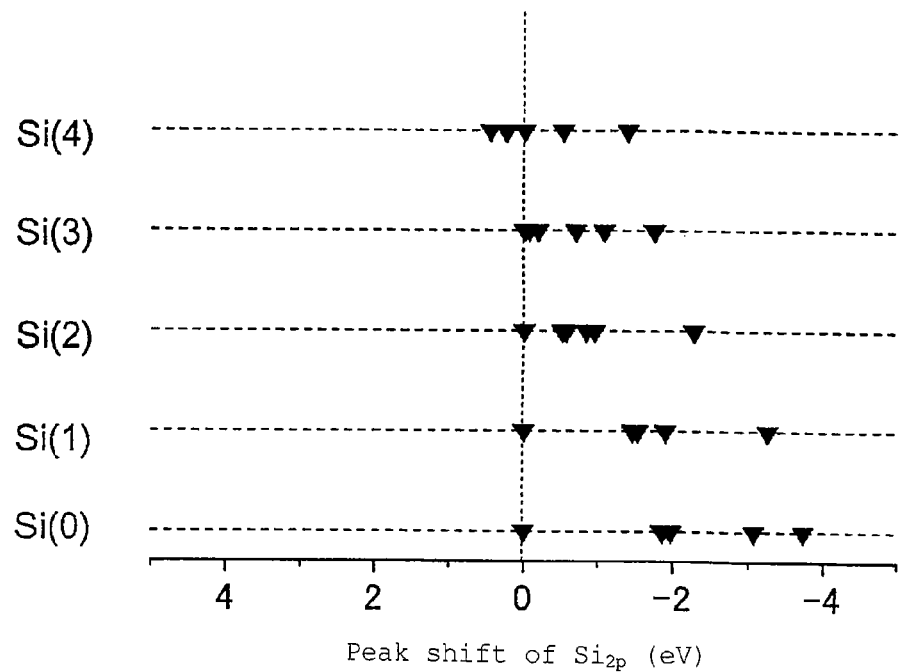

[FIG. 30]
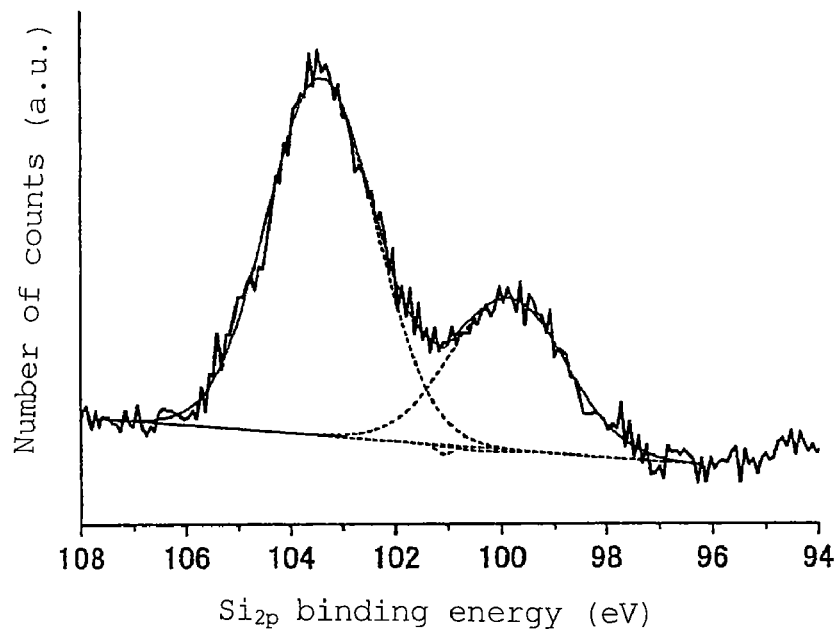
[FIG. 31]
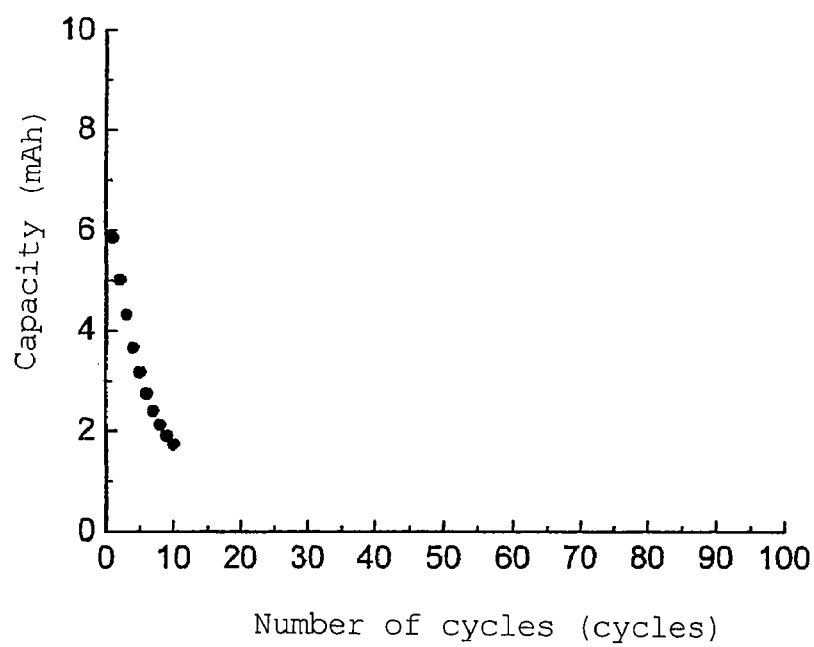

[FIG. 32]
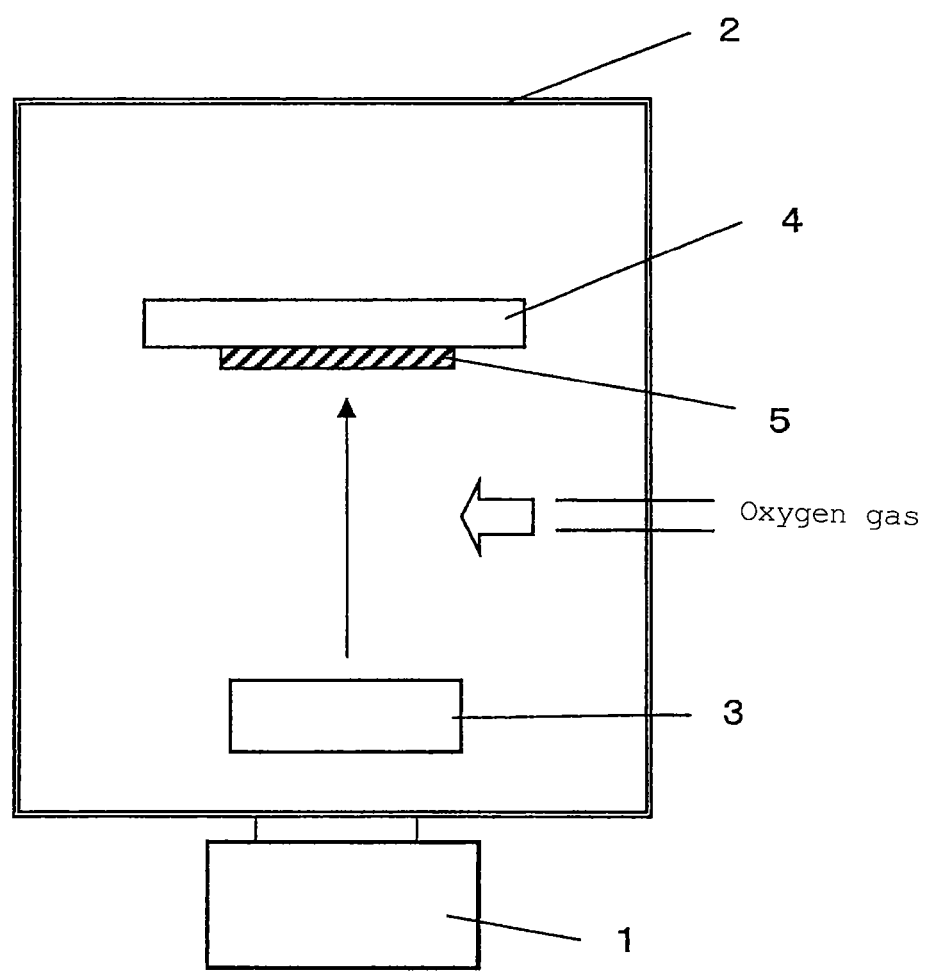

[FIG. 33]
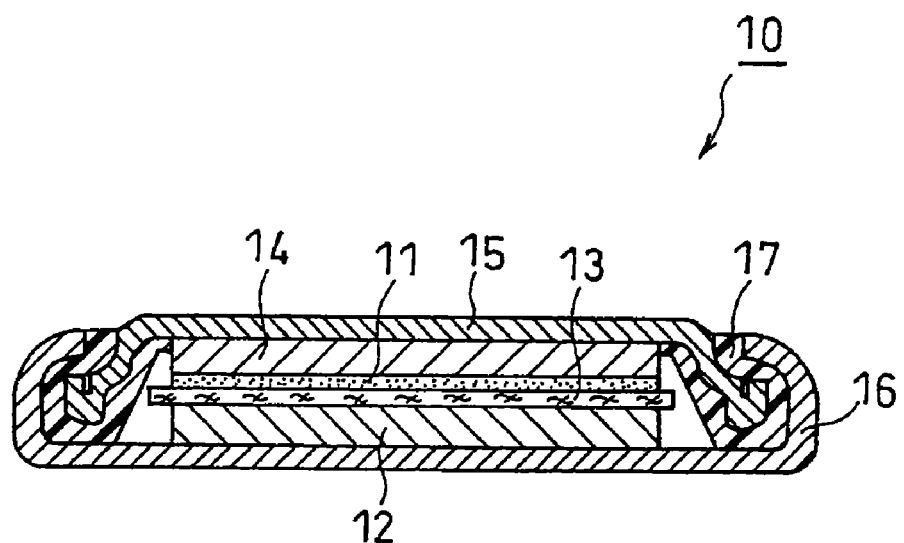

NEGATIVE ELECTRODE ACTIVE MATERIAL AND NEGATIVE ELECTRODE USING THE SAME AND LITHIUM ION SECONDARY BATTERY

TECHNICAL FIELD

The present invention relates to a negative electrode active material for a lithium ion secondary battery and a negative electrode using the same and a lithium ion secondary battery.

BACKGROUND ART

In recent years, reduction in size and improvement in performance have become increasingly evident in portable information terminals such as personal computers (PCs), cell phones and personal digital assistants (PDAs), and audio visual devices such as video recorders and memory audio players, for which lithium ion secondary batteries are used.

As such reduction in size and improvement in performance continues, the improvement in capacity of lithium ion secondary batteries has been needed. In the conventional lithium ion secondary batteries, a lithium-containing transition metal oxide, such as lithium cobaltate or lithium nickelate, is used for a positive electrode, and a carbonaceous material, such as graphite, is used for a negative electrode. However, the improvement in capacity achieved by a combination of these materials in commercially available lithium ion secondary batteries has been approaching the limit of improvement.

Under these circumstances, examination has been made on selection and design of such a negative electrode active material that enables improvement in capacity in lithium ion secondary batteries to be accomplished. The negative electrode active materials for improvement in capacity that are under examination are exemplified by metal lithium, aluminum to be alloyed with lithium, silicon, tin, and the like (e.g., Non-patent Document 1). Among these, silicon has a large theoretical capacity. For this reason, there has been proposed a lithium ion secondary battery in which silicon is used as an active material (e.g., Patent Document 1).

However, since silicon undergoes a significant volume change during the reaction with lithium ions, the current collecting performance is reduced by repeated charge and discharge, making it impossible to achieve sufficient cycle characteristics.

As a negative electrode active material for solving this problem, there has been proposed $SiO_x$ (0<x<2) (e.g., Patent Document 2 and Patent Document 3). The $SiO_x$ has a high capacity and exerts stable cycle characteristics. However, Li having been inserted in the $SiO_x$ during charge in the early stage is not completely released therefrom, causing a so-called irreversible capacity to increase.

In view of the above, the use of a lithium silicate compound originally containing Li has been proposed. For example, a lithium silicate compound represented by $Li_ySiO_x$ (0<y, and 0<x<2), such as $Li_4SiO_4$, $Li_2SiO_3$, $Li_2Si_2O_5$, $Li_4Si_3O_8$, and $Li_6Si_4O_{11}$, has been proposed (Patent Document 2). Moreover, in order to obtain favorable cycle characteristics, there has been proposed a negative electrode active material obtained by heating $SiO_x$ to crystallize it so that a diffraction peak corresponding to the (220) plane of Si can appear in the X-ray diffraction pattern (Patent Document 3).

In addition, in order to suppress the volume expansion due to charge and discharge, there has been proposed a negative electrode active material including silicon with an oxidation number of 0, a silicon compound having a silicon atom with an oxidation number of +4, and a lower oxide of silicon having a silicon atom with an oxidation number of greater than 0 and less than +4 (e.g., see Patent Document 4).

Furthermore, there has been proposed a SiO thin film studied with the use of X-ray photoelectron spectroscopy (XPS), the thin film including silicon with an oxidation number of 0, a silicon compound having a silicon atom with an oxidation number of +4, and a lower oxide of silicon having a silicon atom with an oxidation number of greater than 0 and less than +4. The charge-discharge reaction mechanism of the SiO thin film has also been disclosed (e.g., see Non-patent Document 2).

In a silicon oxide having a chemical composition represented by SiO, on a microscopic scale, Si and $SiO_2$ are present in a phase separation state. It is known therefore that SiO represents an average composition (e.g., Non-patent Document 3).

The silicon oxide has structural units having a tetrahedral geometry. Other forms of silicon oxide other than $SiO_2$ (hereinafter referred to as intermediate oxides) can be represented by $Si_2O$, $SiO$, and $Si_2O_3$ in accordance with the number of oxygen atoms on the vertices of the tetrahedron, one, two, and three, respectively. These intermediate oxides are thermodynamically unstable and are extremely difficult to present as a simple crystal. Presumably for this reason, SiO represents an average composition as described above. It should be noted that X-ray photoelectron spectroscopy (XPS) of the intermediate oxides as described above clearly detects two separate peaks attributable to Si and $SiO_2$.

Patent Document 1: Japanese Laid-Open Patent Publication 2002-83594
Patent Document 2: Japanese Laid-Open Patent Publication Hei 6-325765
Patent Document 3: Japanese Laid-Open Patent Publication 2004-71542
Patent Document 4: Japanese Laid-Open Patent Publication 2005-183264
Non-patent Document 1: Solid State Ionics, 57, 113-115 (1998)
Non-patent Document 2: Journal of The Electrochemical Society, 152 (10), A2089 (2005)
Non-patent Document 3: Journal of Non-Crystalline Solids, 204 (2), 202-203 (1996)

DISCLOSURE OF THE INVENTION

Problem to be Solved by the Invention

However, the electron conductivity of the foregoing $Li_ySiO_x$ disclosed in Patent Document 2 is extremely small. It is extremely difficult therefore to release and insert lithium ions from and into $Li_ySiO_x$ at a transfer rate desired for lithium ion secondary batteries.

The foregoing negative electrode active material disclosed in Patent Document 3 becomes a mixture of Si and $SiO_2$ through heat-treatment at a temperature of 830° C. or higher in non-oxidation atmosphere. In this case, only Si can be involved in charge and discharge, and $SiO_2$ will not be involved in charge and discharge. For this reason, although a certain amount or more of Si is contained, it is comparatively difficult to provide a sufficiently high capacity. Further, $SiO_2$ has no electron conductivity, causing the resistance of the negative electrode to increase. This consequently makes it extremely difficult to release and insert lithium ions from and into the negative electrode active material at a transfer rate desired for lithium ion secondary batteries.

Patent Document 4 discloses with reference to an example that a mixture of silicon monocrystalline particles, amorphous SiO$_2$, and amorphous SiO is melted by irradiation of electron beams, and then the molten material thus obtained is vapor-deposited on a support body to give a thin film. FIG. 27 appended hereto shows vapor pressure curves of silicon monocrystalline particles, amorphous SiO$_2$, and amorphous SiO (Vacuum Handbook, edited by Ulvac Inc., Ohmsha, pp. 148-149). As is evident from FIG. 27, the difference in vapor pressure between SiO$_2$ and SiO is extremely great. Furthermore, amorphous SiO has a high sublimating property. Therefore, it is extremely difficult to give a homogeneous thin film.

In view of the problems associated with the conventional art as described above, the present invention intends to provide a negative electrode active material for a lithium ion secondary battery capable of exerting excellent charge-discharge cycle characteristics without impairing a high charge-discharge capacity which is a general feature of an active material containing silicon, and to further provide a negative electrode and a lithium ion secondary battery using the same.

Means for Solving the Problem

In order to solve the foregoing problems, a negative electrode active material for a lithium ion secondary battery of the present invention includes a silicon oxide capable of absorbing and desorbing lithium ions, wherein the silicon oxide has structural units each in the form of a tetrahedron in which a silicon atom is located at its center and silicon or oxygen atoms are located at its four vertices, the structural units being arranged randomly to form an amorphous structure.

In the silicon oxide constituting the negative electrode active material of the present invention, the foregoing four vertices are shared between the tetrahedrons adjacent to each other in the amorphous structure. It should be noted that there may be present a vertex that is not shared, as long as the effect of the present invention is not impaired.

The "amorphous structure" of the silicon oxide in the present invention is mainly composed of homogeneous amorphous structure portions. The "homogeneous amorphous structure" means an amorphous structure composed of a plurality of amorphous compounds without any interfaces being formed, that is, an amorphous structure in which no interfaces are present (see FIG. 3). However, it may include, for example, a gradient portion in which the composition varies continuously. In addition, the foregoing silicon oxide in the present invention may include a "heterogeneous amorphous portion" to an extent such that the effect of the present invention is not impaired. Further, the foregoing silicon oxide may include a crystalline portion to an extent such that the effect of the present invention is not impaired. Whether the amorphous structure of the obtained silicon oxide is "homogeneous" or not and includes a gradient portion or not can be checked by observation with a transmission electron microscope (TEM) and the like.

The silicon oxide having an amorphous structure is stable itself in the negative electrode active material of the present invention as described above. Further, lithium ions can be inserted into and released from the silicon oxide at a sufficiently high rate. Because of this, it is possible to obtain a negative electrode active material for a lithium ion secondary battery capable of exerting excellent charge-discharge cycle characteristics while maintaining a high charge-discharge capacity which is a feature of an active material containing silicon.

In the case that the number of oxygen atoms located at the four vertices in the structural units is represented by n (n=0, 1, 2, 3 or 4), and the structural units are represented by Si(n), the number of the structural units NSi(n) in the silicon oxide satisfies the following relations (1) to (3).

[Formula 1]

$$\frac{NSi(0)}{\sum NSi(n)} \geq 0.1 \quad (1)$$

$$\frac{Nsi(4)}{\sum NSi(n)} \leq 0.1 \quad (2)$$

$$Nsi(1) + NSi(2) + Nsi(3) \neq 0 \quad (3)$$

It is preferable that the number of the structural units NSi(n) satisfies at least one of the following relations (4) to (6).

[Formula 2]

$$0.119 \leq \frac{NSi(0)}{\sum NSi(n)} \leq 0.8 \quad (4)$$

$$0 \leq \frac{Nsi(4)}{\sum NSi(n)} \leq 0.1 \quad (5)$$

$$0.231 \leq \frac{Nsi(1) + NSi(2) + Nsi(3)}{\sum NSi(n)} < 1 \quad (6)$$

A lithium ion secondary battery of the present invention comprises a positive electrode capable of absorbing and desorbing lithium ions, a negative electrode including the foregoing negative electrode active material of the present invention, a separator interposed between the positive electrode and the negative electrode, and an electrolyte with lithium ion conductivity.

In the lithium ion secondary battery of the present invention, because of the use of the negative electrode active material of the present invention as described above therein, a high charge-discharge capacity and excellent charge-discharge characteristics can be more reliably achieved in a compatible manner.

Further, a negative electrode active material for a lithium ion secondary battery of the present invention including a silicon oxide capable of absorbing and desorbing lithium ions is produced by a method comprising the steps of:

melting a silicon source to give a molten silicon material, vapor-depositing the molten silicon material on a substrate having a temperature lower than an ambient temperature to give a negative electrode active material including a silicon oxide, the silicon oxide having structural units each in the form of a tetrahedron in which a silicon atom is located at its center and silicon or oxygen atoms are located at its four vertices, and the structural units being arranged randomly to form an amorphous structure.

According to the method as described above, it is possible to more reliably provide a negative electrode active material for a lithium ion secondary battery capable of exerting excellent charge-discharge cycle characteristics while maintaining a high charge-discharge capacity.

Effect of the Invention

According to the present invention, it is possible to provide a negative electrode active material for a lithium ion secondary battery capable of exerting excellent charge-discharge cycle characteristics without impairing a high charge-discharge capacity which is a general feature of an active material containing silicon, and to provide a negative electrode and a lithium ion secondary battery using the same.

BRIEF DESCRIPTION OF THE DRAWINGS

FIG. 1 A diagram showing an example of the microstructure of a negative electrode active material according to one embodiment of the present invention.

FIG. 2 A view showing an X-ray diffraction pattern of the negative electrode active material according to one embodiment of the present invention.

FIG. 3 A view showing a transmission electron microscope image of the negative electrode active material according to one embodiment of the present invention.

FIG. 4 A view showing a diffraction ring pattern of the negative electrode active material according to one embodiment of the present invention.

FIG. 5 A graph showing a $Si_{2p}$ binding energy profile obtained by measurement with X-ray photoelectron spectroscopy of a $SiO_x$ thin film of Example 1 of the present invention.

FIG. 6 A graph showing charge-discharge characteristics of a coin-type battery using the $SiO_x$ thin film of Example 1 of the present invention.

FIG. 7 A graph showing charge-discharge cycle characteristics of the coin-type battery using the $SiO_x$ thin film of Example 1 of the present invention.

FIG. 8 A graph showing $O_{1s}$ binding energy profiles obtained by measurement with X-ray photoelectron spectroscopy in the initial state and after a charge-discharge cycle of the $SiO_x$ thin film of Example 1 of the present invention.

FIG. 9 A graph showing a $Si_{2p}$ binding energy profile obtained by measurement with X-ray photoelectron spectroscopy of a $SiO_x$ thin film of Example 2 of the present invention.

FIG. 10 A graph showing charge-discharge characteristics of a coin-type battery using the $SiO_x$ thin film of Example 2 of the present invention.

FIG. 11 A graph showing charge-discharge cycle characteristics of the coin-type battery using the $SiO_x$ thin film of Example 2 of the present invention.

FIG. 12 A graph showing a $Si_{2p}$ binding energy profile obtained by measurement with X-ray photoelectron spectroscopy of a $SiO_x$ thin film of Example 3 of the present invention.

FIG. 13 A graph showing charge-discharge characteristics of a coin-type battery using the $SiO_x$ thin film of Example 3 of the present invention.

FIG. 14 A graph showing charge-discharge cycle characteristics of the coin-type battery using the $SiO_x$ thin film of Example 3 of the present invention.

FIG. 15 A graph showing a $Si_{2p}$ binding energy profile obtained by measurement with X-ray photoelectron spectroscopy of a $SiO_x$ thin film of Comparative Example 1 of the present invention.

FIG. 16 A graph showing charge-discharge characteristics of a coin-type battery using the $SiO_x$ thin film of Comparative Example 1 of the present invention.

FIG. 17 A graph showing charge-discharge cycle characteristics of the coin-type battery using the $SiO_x$ thin film of Comparative Example 1 of the present invention.

FIG. 18 A graph showing a $Si_{2p}$ binding energy profile obtained by measurement with X-ray photoelectron spectroscopy of a $SiO_x$ thin film of Comparative Example 2 of the present invention.

FIG. 19 A graph showing charge-discharge characteristics of a coin-type battery using the $SiO_x$ thin film of Comparative Example 2 of the present invention.

FIG. 20 A graph showing charge-discharge cycle characteristics of the coin-type battery using the $SiO_x$ thin film of Comparative Example 2 of the present invention.

FIG. 21 A graph showing a $Si_{2p}$ binding energy profile obtained by measurement with X-ray photoelectron spectroscopy of a $SiO_x$ powder-coated electrode plate of Comparative Example 3 of the present invention.

FIG. 22 A graph showing charge-discharge characteristics of a coin-type battery using the $SiO_x$ powder-coated electrode plate of Comparative Example 3 of the present invention.

FIG. 23 A graph showing charge-discharge cycle characteristics of the coin-type battery using the $SiO_x$ powder-coated electrode plate of Comparative Example 3 of the present invention.

FIG. 24 A graph showing a $Si_{2p}$ binding energy profile obtained by measurement with X-ray photoelectron spectroscopy of a $SiO_x$ thin film of Comparative Example 4 of the present invention.

FIG. 25 A graph showing charge-discharge characteristics of a coin-type battery using the $SiO_x$ thin film of Comparative Example 4 of the present invention.

FIG. 26 A graph showing charge-discharge cycle characteristics of the coin-type battery using the $SiO_x$ thin film of Comparative Example 4 of the present invention.

FIG. 27 A graph showing vapor pressure curves of silicon, silicon monoxide, and silicon dioxide used in Comparative Example 5 of the present invention.

FIG. 28 A graph showing variations in $Si_{2p}$ binding energy during a charge-discharge process of a $SiO_x$ thin film of the present invention.

FIG. 29 A graph showing variations in $Si_{2p}$ binding energy in a charge-discharge process of the $SiO_x$ thin film of the present invention, sorted according to the number of bridging oxygen atoms with Si.

FIG. 30 A graph showing a $Si_{2p}$ binding energy profile obtained by measurement with X-ray photoelectron spectroscopy of a commercially available $SiO_x$ powder used in Comparative Example 6 of the present invention.

FIG. 31 A graph showing charge-discharge characteristics of a coin-type battery using the commercially available $SiO_x$ powder of Comparative Example 6 of the present invention.

FIG. 32 A schematic diagram of an apparatus for producing the silicon oxide according to one embodiment of the present invention.

FIG. 33 A schematic cross sectional diagram of a coin-type lithium ion secondary battery according to one embodiment of the present invention.

BEST MODE FOR CARRYING OUT THE INVENTION

A best mode for carrying out the present invention is described below with reference to drawings.

A negative electrode active material according to one embodiment of the present invention includes a silicon oxide capable of absorbing and desorbing lithium ions. The silicon oxide is not a simple mixture of Si and $SiO_2$ but has structural units each in the form of a tetrahedron in which a silicon atom is located at its center and silicon or oxygen atoms are located at its four vertices as shown in FIG. 1. The structural units are arranged randomly with the four vertices being shared between the structural units adjacent to each other, to form an amorphous structure. FIG. 1 is a schematic diagram showing an example of the microstructure of the negative electrode active material of the present invention.

The silicon oxide constituting the negative electrode active material of the present embodiment is formed in an amorphous state. It is assumed therefore that five types of tetrahedral structural units of Si (Si—Si$_4$: Note that the symbol before "—" represents an atom located at the center of the tetrahedral, and the symbol after "—" represents an atom located at the four vertices of the tetrahedral. This applies to the following), Si$_2$O (Si—Si$_3$O), SiO (Si—Si$_2$O$_2$), Si$_2$O$_3$ (Si—SiO$_3$), and SiO$_2$ (Si—O$_4$) are present in an arbitrary ratio with sharing vertices in a homogenous manner without showing any phase separation.

In general, it is known that in the structural unit of a silicon oxide having a chemical composition represented by SiO$_x$, a silicon atom is located at the center of the tetrahedron, and silicon or oxygen atoms are located in four binding orbital formed by sp$^3$ hybridization.

In the case of Si (i.e., SiO$_x$, where x=0), Si is located at all vertices. In the case of SiO$_2$ (i.e., SiO$_x$, where x=2), O is located at all vertices. The Si$_{2p}$ binding energy of Si is 99±1 eV, and the Si$_{2p}$ binding energy of SiO$_2$ is 103±1 eV, which are different from each other.

The negative electrode active material of the present invention may have various forms. For example, it may be of a particulate form or a thin film form. In terms of the production process, in order to more reliably obtain a silicon oxide having the foregoing structure, the negative electrode active material of the present embodiment is preferably of a thin film form. More specifically, the negative electrode active material may be of a thin film form, for example, in which particles are deposited so as to have gain boundaries. Further, the negative electrode active material may be in a form of a uniform thin film or in a form a partially-nonuniform thin film as long as the effect of the present invention is not impaired.

FIG. 28 shows a graph showing variations in Si$_{2p}$ binding energy during a charge-discharge process of the negative electrode active material of the present embodiment composed of a SiO$_x$ thin film (x=0.6). FIG. 29 is a graph showing variations in Si$_{2p}$ binding energy during a charge-discharge process of the negative electrode active material of the present embodiment composed of the SiO$_x$ thin film, sorted according to the number of bridging oxygen atoms with Si.

As shown in FIG. 28 and FIG. 29, charge reaction (insertion of Li ions) and discharge reaction (release of Li ions) causes variations in Si$_{2p}$ binding energy. The amplitude of variation (shift amount from the initial state) is reduced such that Si>Si$_2$O>SiO>Si$_2$O$_3$>SiO$_2$.

Since the silicon oxide in the negative electrode active material of the present invention has a structure as described above, Si contained in the intermediate oxides is assumed to be involved in charge and discharge, providing a high charge-discharge capacity.

In addition, in the silicon oxide constituting the negative electrode active material according to the present embodiment, the Si$_{2p}$ binding energy varies continuously. Because of this, in the case that the number of oxygen atoms located at four vertices in the structural unit is represented by n (n=0, 1, 2, 3 or 4), and the structural unit is represented by Si(n), peaks each corresponding to the number of the structural units NSi (n) are observed in an XPS spectrum obtained by measurement with XPS of the silicon oxide.

On the basis of the peaks thus observed, the number of the structural units NSi(n) can be determined from a peak area determined with a conventional method (e.g., the method described in Applied Surface Science, 70/71, pp. 222-225 (1993)).

The inventors of the present invention have thus found that in order to more reliably achieve the effect of the present invention as described above, it is preferable that the number of the structural units NSi(n) in the foregoing silicon oxide satisfies the following relations (1) to (3).

[Formula 3]

$$\frac{NSi(0)}{\sum NSi(n)} \geq 0.1 \quad (1)$$

$$\frac{Nsi(4)}{\sum NSi(n)} \leq 0.1 \quad (2)$$

$$Nsi(1) + NSi(2) + Nsi(3) \neq 0 \quad (3)$$

Here, when the content ratio of Si(O) (i.e., the value of the foregoing relation (1)) is 0.1 or more, the negative electrode active material of the present embodiment can more reliably exert a practical capacity.

It is further preferable that Si(4) is present in the silicon oxide constituting the negative electrode active material of the present invention so that the tolerance to the stress due to expansion and contraction of Si(0) can be increased. When the content ratio of Si(4) (i.e., the value of the foregoing relation (2)) is 0.1 or less, the ratio of Si(4) is not too high, which makes it possible to ensure a certain amount of silicon capable of reaction and thus to more reliably hold an appropriate level of capacity. It should be noted that Si(4) is a nonconductive material. However, if the content ratio of Si(4) being a nonconductive material is 0.1 or less, there is no significant influence of polarization in practical use.

The condition of the foregoing relation (3) indicates that the structural units of Si(1), Si(2) and Si(3) are included in a bonded manner among Si(0) and Si(4) (i.e., in the amorphous structure of the foregoing silicon oxide).

The inclusion of these structural units in the amorphous structure of the silicon oxide causes the bond energy to vary continuously. This can provide a strong structure against variations in volume of Si(0) occurring during charge-discharge cycles. It is known that the structural units of Si(1), Si(2) and Si(3) are capable of absorbing and desorbing lithium (the foregoing Patent Document 4).

As described above, the inclusion of Si(1), Si(2) and Si(3) in the silicon oxide constituting the negative electrode active material according to the present embodiment and the suppression of the content ratio of Si(4) (i.e., the value of the foregoing relation (2)) to 0.1 or less make it possible to secure a charge-discharge capacity and to more reliably circumvent the problem of polarization.

In addition, it is preferable that the number of the structural units NSi(n) satisfies at least one of the following relations (4) to (6).

[Formula 4]

$$0.119 \leq \frac{NSi(0)}{\sum NSi(n)} \leq 0.8 \quad (4)$$

$$0 \leq \frac{Nsi(4)}{\sum NSi(n)} \leq 0.1 \quad (5)$$

$$0.231 \leq \frac{Nsi(1) + NSi(2) + Nsi(3)}{\sum NSi(n)} < 1. \quad (6)$$

If NSi(0)/Σ NSi(n) exceeds 0.8, variations in volume occurring during charge and discharge of the silicon oxide may become significant, causing the negative electrode active material to be separated or dropped from the current collector. This may make it difficult to obtain favorable charge-discharge characteristics.

If NSi(4)/Σ NSi(n) exceeds 0.1, the electron conductivity of the silicon oxide is reduced, possibly causing the internal resistance of the negative electrode to increase. This may results in a higher degree of polarization and a lower charge-discharge capacity.

A higher content ratio of Si(1), Si(2) and Si(3) is preferred because the variation in volume thereof due to charge and discharge is smaller than that of Si(0), and the electron conductivity thereof is higher than that of Si(4). When {NSi(1)+NSi(2)+NSi(3)}/Σ NSi(n) is 0.231 or more, it is highly reliable that favorable charge-discharge cycle characteristics is achieved.

The silicon oxide of the present embodiment can be represented by $SiO_x$, and the value x can be determined by X-ray fluorescence spectroscopy. In the case that the value x is determined by X-ray fluorescence spectroscopy, it is preferable that x satisfies $0.1 \leq x \leq 1.2$. Here, the value x represents a mean value as described below.

When x is 0.1 or more, as in the case of Si alone, the volume expansion occurring during charge and discharge will not be significant, making it possible to more reliably suppress the reduction in the current collecting performance between the active material particles and the reduction in the charge-discharge cycle characteristics. When x is 1.2 or less, an appropriate level of high-rate charge-discharge characteristics can be ensured without causing much reduction. Furthermore, when x is 1.2 or less, the amount of oxygen is not too great, making it possible to suppress the resistance of the negative electrode at a low level as well as to inhibit the polarization.

More specifically, in order to more reliably achieve an appropriate level of charge-discharge cycle characteristics and high-rate charge-discharge characteristics in a well-balanced manner, $0.1 \leq x \leq 0.6$ is preferred.

In the silicon oxide ($SiO_x$) constituting the negative electrode active material of the present embodiment, oxygen atoms are present in its skeleton, forming Si—O—Si bonds. Because of this, the gap formed around the silicon atom located at the center of the tetrahedron is longer than the bond length between Si—Si bonds. Furthermore, the Si—O bond energy is 430 kJ/mol, which is markedly greater than the Si—Si bond energy of 184 kJ/mol.

For the reasons above, the variation in volume that occurs when Li ions are inserted is effectively suppressed, and as a result, excellent charge-discharge cycle characteristics can be achieved.

The silicon oxide ($SiO_x$) as described above constituting the negative electrode active material according to the present embodiment can be formed by, for example, a sputtering method or a vapor-deposition method. For example, a negative electrode active material in a form of film can be formed by sputtering or vapor-depositing a silicon source in a vacuum chamber on a substrate made of, for example, a copper foil.

In the sputtering or vapor-deposition, an oxygen gas is introduced into the vacuum chamber and an increase in temperature of a film-forming face (a reaction face) of the substrate is prevented. This can inhibit the crystallization of the resultant negative electrode active material. In other words, the formation of a negative electrode active material including a silicon oxide having an amorphous structure as described above is performed while the crystallization is inhibited. In order to suppress the increase in temperature of the film-forming face of the substrate, it suffices to cool the substrate. The temperature of the substrate is preferably 500° C. or lower, and particularly preferably room temperature to 300° C.

Next, a production method of a silicon oxide constituting the negative electrode active material according to the present embodiment, and an example of evaluation method of the silicon oxide are described below.

(1) Fabrication of a $SiO_x$ Thin Film Constituting the Negative Electrode Active Material FIG. 32 is a schematic diagram illustrating a configuration of an apparatus for producing the negative electrode active material (i.e., silicon oxide) of the present invention. In FIG. 32, the air in a vacuum chamber 2 is exhausted with an exhaust pump 1. First, in a carbon crucible 3 placed in the vacuum chamber 2, silicon having a purity of 99.99% or more (a tablet obtained by molding particles, masses or powder) is set. An electron gun (not shown) is used to irradiate the silicon with electron beams (EB), so that the silicon is melted and evaporated. Consequently, a negative electrode active material made of a $SiO_x$ thin film is formed by vapor-deposition method on a substrate 5 made of, for example, a copper foil disposed opposite to the carbon crucible 3.

Vapor deposition of silicon simply in vacuum yields a Si film only. For this reason, in the present embodiment, an oxygen gas is introduced into the vacuum chamber to allow reactive vapor deposition to proceed, so that a $SiO_x$ thin film is formed. In other words, silicon is vapor deposited while reacted with oxygen. The value x of the resultant $SiO_x$ thin film is adjustable through adjustment of the amount of oxygen gas to be introduced into the vacuum chamber (i.e., the atmospheric oxygen concentration).

Moreover, in the present embodiment, in order to render the resultant $SiO_x$ thin film amorphous, the temperature of the substrate 5 is kept lower than atmospheric temperature, and preferably kept at approximate room temperature. The temperature of the substrate 5 may be lowered by, for example: (i) allowing a cooling water to flow through a substrate holder 4 for holding a substrate to cool the substrate, or alternatively disposing a cooling plate so as to be in contact with the substrate or the substrate holder 4 and allowing a cooling water to flow through the cooling plate, thereby to cool the substrate; and (ii) attaching a Peltier device on the substrate or the substrate holder to cool the substrate. In view of cooling the substrate more easily and reliably, the foregoing method (i) is preferred.

(2) Determination of Value x in $SiO_x$

The value x in $SiO_x$ can be determined by measuring a region from the surface layer to the depth of several micrometers of the resultant $SiO_x$ thin film with the use of, for example, the fundamental parameter method in X-ray fluorescence spectroscopy using O-Kα radiation. For the X-ray fluorescence spectroscopy, for example, RIX3000 available from Rigaku Corporation may be used. The X-ray fluorescence spectroscopy may be performed under the conditions of, for example, using rhodium (Rh) as a target and setting the tube voltage at 50 kV and the tube current at 50 mA. Since the value x determined here is calculated from the intensities of O-Kα radiation detected in the measurement region on the substrate, the value x is a mean value obtained in the measurement region.

Alternatively, as another method, it is possible to determine the value x by combusting the entire resultant $SiO_x$ thin film. For example, the $SiO_x$ thin film is set in a graphite crucible disposed in a combustion tube, and then power is applied to the crucible to generate heat. The temperature at this time is about 3000° C. A He gas is allowed to flow as a carrier in the combustion tube and the amounts of $CO_2$ and CO thus generated are quantified to measure the amount of oxygen. From the amount of oxygen thus determined and the weight measured beforehand, the value x in $SiO_x$ is determined.

(3) X-Ray Diffractometry

The formation of amorphous structure can be verified by X-ray diffractometry (XRD). For the XRD, for example, RINT-2000 available from Rigaku Corporation may be used.

The XRD may be performed under the conditions of, for example: using Cu-Kα radiation as X-ray source; setting the tube voltage at 40 kV and the tube current at 40 mA; and in the measurement, setting the scanning range of 2 θ/θ at 10 to 80°, the scanning step at 0.02°, and the scanning rate at 0.6°/min. If a clear diffraction peak is not observed but a broad diffraction pattern is obtained, the $SiO_x$ is amorphous in terms of X-ray.

(4) X-Ray Photoelectron Spectroscopy (XPS)

The values of the foregoing relations (1) to (3) can be determined by X-ray photoelectron spectroscopy (XPS). For the XPS, for example, XPS-7000 available from RIGAKU Corporation may be used.

The XPS may be performed under the conditions of, for example, using Al-Kα radiation as X-ray source and setting the tube voltage at 10 kV and the tube current at 10 mA. In order to exclude the influence by an oxide and the like to be formed on the surface for accurate measurement of the condition of the $SiO_x$ thin film, it is preferable to etch the surface of the resultant $SiO_x$ thin film to the depth of, for example, 200 to 300 nm with an Ar gas. This is preferable because, according to the foregoing production method, an almost uniform layer is formed in the resultant $SiO_x$ thin film deeper than about 200 to about 300 nm from the surface. It should be noted that the thickness of the $SiO_x$ thin film constituting the negative electrode active material of the present invention is adjustable according to the specifications of a desired battery, as needed.

The etching may be performed under the conditions of, for example, an accelerating voltage of 500V, an etching angle of 90°, and an ion current density of 160 μA/cm². The etching rate at this time may be about 5 nm/min in terms of $SiO_2$.

The condition of the $SiO_x$ thin film can be checked by the measurement of $Si_{2p}$. Whether the oxide film and the like formed on the surface is removed or not can be checked by the measurement of $C_{1s}$.

The measurement data of the $SiO_x$ thin film constituting the negative electrode active material according to the present invention as used herein have been corrected using Ar with a reference value of $Ar_{2p}$ of 242.3 eV. In other words, the measurement data are data obtained by performing electrostatic charge correction using aberration of $Ar_{2p}$.

In the identification of peaks in an XPS spectrum, assuming that there are five cases in which the numbers of bridging oxygen atoms are 0, 1, 2, 3 and 4, the reference values corresponding to each number are assumed as 99.8 eV, 100.7 eV, 101.5 eV, 102.5 eV and 103.5 eV. The peak separation is then performed using the Gaussian function. It should be noted that this may result in a smaller number of peaks in some cases. For the bond energies used as reference values, the values described in Applied Surface Science, 70/71, pp. 222 to 225 (1993) are applied.

A ratio of the number of atoms corresponds to a ratio of the peak area obtained by performing the peak separation. For this reason, the ratio of the peak area can be calculated as the ratio of the number of atoms.

(5) Fabrication Method of Coin-Type Lithium Ion Secondary Battery

An example of a coin-type lithium ion secondary battery (coin-type battery) is described below with reference to FIG. 33 as a representative sample of a lithium ion secondary battery according to the present invention using the negative electrode active material according to the present invention.

The $SiO_x$ thin film formed on the substrate made of a copper foil in the manner as described above is cut together with the substrate, for example, into a disc having a diameter of 12.5 mm, to yield a negative electrode 11. This negative electrode 11 and a positive electrode 12 are arranged opposite to each other with a polyethylene separator 13 (e.g., thickness: 25 μm, diameter: 17 mm) interposed therebetween, and inserted into a coin-type battery case 16 of size 2016.

Subsequently, an electrolyte for a lithium ion secondary battery is injected into the coin-type case. In order to fill the space in the case, a stainless steel spacer 14 is arranged on the negative electrode, and on the spacer, a sealing plate 15 with a resin gasket 17 disposed on the periphery thereof is applied. Thereafter, the edge of the battery case 16 is crimped onto the sealing plate 15, whereby a coin-type battery 10 of size 2016 (e.g., total height: 1.6 mm, diameter: 20 mm) is fabricated.

For the electrolyte for a lithium ion secondary battery, it is possible to use, for example, an electrolyte obtained by dissolving 1 M of $LiPF_6$ as a solute in a 1:1 (volume ratio) solvent mixture of ethylene carbonate and diethyl carbonate.

It should be noted that there is no limitation on each component of the lithium ion secondary battery according to the present invention except that the foregoing negative electrode active material of the present invention should be used, and components of various types may be selected as long as the effect of the present invention is not impaired.

For the positive electrode, in addition to the foregoing metallic lithium, it is possible to use, for example, a lithium-containing transition metal oxide, such as $LiCoO_2$, $LiNiO_2$, and $LiMn_2O_4$, and a lithium-containing transition metal sulfide, such as $LiTiS_2$ and $LiMoS_2$.

For the separator, it is possible to use, for example, a polyolefin-based porous film. Examples of the polyolefin-based porous film include, for example, a polypropylene porous film, a porous film having a multilayer structure of polyethylene/polypropylene, and the like.

For the solvent of the electrolyte, it is possible to use, for example, cyclic carbonic acid esters typically represented by propylene carbonate (PC) and ethylene carbonate (EC); chain carbonic acid esters typically represented by diethyl carbonate (DEC) and dimethyl carbonate (DMC); cyclic carboxylic acid esters typically represented by γ-butyrolactone (GBL) and γ-valerolactone (GVL); chain ethers, such as dimethoxymethane (DMM) and 1,3-dimethoxypropane (DMP); cyclic esters, such as tetrahydrofuran (THF) and 1,3-dioxolane (DOL); and the like. Two or more of these may be used as a solvent mixture.

For the solute of the electrolyte, it is possible to use, for example, inorganic acid anion lithium salts typically represented by lithium perchlorate ($LiClO_4$), lithium tetrafluoroborate ($LiBF_4$), and lithium hexafluorophosphate ($LiPF_6$); organic acid anion lithium salts, such as lithium trifluoromethanesulfonate ($LiSO_3CF_3$) and lithium bistrifluoromethanesulfonimide (($CF_3SO_2)_2NLi$); and the like. Two or more of these may be used in combination.

(6) Evaluation Method

The lithium ion secondary battery according to the present invention can be evaluated by measuring a charge-discharge capacity with a constant current charge-discharge method.

In the case of the coin-type battery fabricated in the manner as described above, the charge-discharge capacity of the battery as a two-electrode cell is measured. The measurement of the charge-discharge capacity is carried out, for example, by repeating one cycle operation consisting of charge performed at a constant current of 100 μA until an end voltage is reached and discharge performed at a constant current of 100 μA until an end voltage is reached. The measurement ambient temperature may be room temperature (e.g., 25° C.).

EXAMPLES

In the following, the present invention is described more specifically by way of Examples, but the present invention is not limited to these.

Example 1

1. Preparation of Negative Electrode Active Material

In this Example, a negative electrode active material of the present invention was prepared first with the use of a production apparatus having a structure as shown in FIG. 32.

Prior to the preparation, after a silicon tablet was placed in the carbon crucible 3 disposed in the vacuum chamber 2 and the pressure in the vacuum chamber 2 was set at 0.005 Pa, an oxygen gas was introduced at a flow rate of 70 sccm and the pressure in the vacuum chamber 2 was set at 0.13 Pa.

Thereafter, the silicon tablet was irradiated with electron beams from the electron gun under the conditions of a voltage of −9 kV and an EB current of 400 mA, so that silicon is melted to be vapor-deposited on the copper foil (substrate) 5 having a thickness of 50 μm that is arranged opposite to the carbon crucible 3. The vapor deposition was continued until a thin film having a film thickness of 10 μm measure by film thickness detector is formed. The weight of the resultant thin film was 2.4 mg. The copper foil (substrate) 5 was held by the substrate holder 4.

In this process, in order to prevent the substrate 5 from being heated to a temperature as high as a hundred and several tens of degrees in centigrade, a cooling water was allowed to flow through the substrate holder 4 to maintain the temperature of the substrate holder 4 at 20° C. during the vapor deposition. In other words, in order to perform the vapor deposition with such conditions to allow the temperature of the substrate 5 to be lower than ambient temperature, the temperature of the cooling plate being in contact with the substrate 5 was maintained at 20° C. during the vapor deposition. With other conditions set as described below, the $SiO_x$ thin film constituting the negative electrode active material of this example was fabricated. In particular, the flow path for the cooling water was designed as a serpentine flow path having 6 mm inner diameter, which made it possible to sufficiently cool the substrate 5.

Material of substrate holder: Copper
Size of substrate holder (width, length, thickness): 10 cm×10 cm×2.5 cm
Temperature of cooling water: 15° C.
Flow rate of cooling water: 3 L/min
Flow path for cooling water in substrate holder: Serpentine flow path with an inner diameter of 6 mm 2. Evaluation of Negative Electrode Active Material The resultant $SiO_x$ thin film was subjected to the X-ray fluorescence spectroscopy with the foregoing conditions for determination of a value x. As a result, the value x was 0.6.

Further, the resultant $SiO_x$ thin film was subjected to the X-ray diffractometry as described above. The obtained X-ray diffraction pattern is shown in FIG. 2. In FIG. 2, the vertical axis indicates the intensity (the number of counts), and the horizontal axis indicates the diffraction angle 2θ (°). From the X-ray diffraction pattern shown in FIG. 2, the production of the negative electrode active material including a silicon oxide having an amorphous structure was verified.

Furthermore, the resultant $SiO_x$ thin film was observed with a transmission electron microscope. The obtained transmission electron microscopic image is shown in FIG. 3. The diffraction ring obtained at this time is shown in FIG. 4.

In the transmission electron microscopic image shown in FIG. 3, crystallite of 2 nm or more in size was not observed. In addition, the diffraction ring had a hollow pattern. From these results, the formation of a homogeneous amorphous structure in the resultant $SiO_x$ thin film was verified.

Moreover, the $Si_{2p}$ binding energy was measured with the X-ray photoelectron spectroscopy as described above. The result is shown in FIG. 5. Five separate peaks of $Si_{2p}$ binding energy were obtained in the range of 99 eV to 104 eV. Respective peaks are attributed to Si(0), Si(1), Si(2), Si(3) and Si(4) from the low energy side, and the area ratio of these calculated assuming that the total sum was 100 was 50.9:15.3:17.3:9.2:7.3. Accordingly, the following relations were obtained.

$$\frac{NSi(0)}{\sum NSi(n)} = 0.509 > 0.1 \qquad \text{[Formula 5]}$$

$$\frac{Nsi(4)}{\sum NSi(n)} = 0.073 < 0.1$$

$$Nsi(1) + NSi(2) + Nsi(3) = 41.8 \neq 0$$

3. Fabrication of Coin-Type Battery

A coin-type battery having the structure shown in FIG. 33 was fabricated with the use of the $SiO_x$ thin film fabricated in the manner as described above.

Specifically, the $SiO_x$ thin film fabricated on the copper foil substrate in the manner as described above was cut together with the substrate into a disc having a diameter of 12.5 mm, to yield a negative electrode. This negative electrode and a counter electrode made of metallic lithium (thickness: 300 μm, diameter: 15 mm) were arranged opposite to each other with a polyethylene separator (thickness: 25 μm, diameter: 17 mm) interposed therebetween, and inserted into a coin-type battery case of size 2016.

Subsequently, an electrolyte obtained by dissolving 1 M of $LiPF_6$ as a solute in a 1:1 (volume ratio) solvent mixture of ethylene carbonate and diethyl carbonate was injected into the coin-type case. Thereafter, a stainless steel spacer was arranged in the space in the case, and on the spacer, a sealing plate with a polypropylene gasket disposed on the periphery thereof was applied. Thereafter, the edge of the case was crimped onto the sealing plate, whereby a coin-type battery of size 2016 (the lithium ion secondary battery of the present invention) was fabricated.

4. Evaluation of Coin-Type Battery

The coin-type battery fabricated in the manner as described above was measured for a charge-discharge capacity with the foregoing evaluation method. The obtained charge-discharge characteristics are shown in FIG. 6, and the obtained charge-discharge cycle characteristics are shown in FIG. 7. In FIG. 6, the vertical axis indicates the potential (V) at the negative electrode versus metallic lithium, and the horizontal axis indicates the capacity (mAh). In FIG. 7, the vertical axis indicates the capacity (mAh), and the horizontal axis indicates the number of cycles (cycles).

From the FIG. 7, the coin-type battery of this example demonstrated a capacity as high as about 5.8 mAh in the initial state. Even after the passage of 200 cycles, the capacity was maintained at about 5.7 mAh, which was 90% or more of the capacity in the initial state. It was found therefore that the coin-type battery of this example had excellent charge-discharge cycle characteristics. Further, from FIG. 6, the charge capacity, the discharge capacity, and the irreversible capacity were 7.5 mAh, 5.8 mAh, and 1.7 mAh, respectively, and the potential difference between the charge curve and the discharge curve was small. It was found therefore that the coin-type battery of this example was excellent in polarization characteristics as well as high-rate charge-discharge characteristics.

Moreover, the $O_{1s}$ binding energy was measured with X-ray photoelectron spectroscopy before charge and discharge and after one cycle of charge and discharge. The results are shown in FIG. 8. In FIG. 8, the vertical axis indicates the number of counts (arbitrary unit), and the horizontal axis indicates the binding (bond) energy (eV).

From FIG. 8, it was observed that the $O_{1s}$ binding energy attributed to bridging oxygen atoms before charge had a peak at 532 eV. It was found, however, after discharge in which the battery experienced one cycle of charge and discharge, the peak shifted to 530 eV because of the influence of non-bridging oxygen atoms resulted from the formation of Si—O—Li. This means that the irreversible capacity is based on the formation of Si—O—Li.

Example 2

The negative electrode active material of the present invention was prepared in the same manner as in Example 1 except that the flow rate of oxygen gas introduced into the vacuum chamber was set at 45 sccm and a thin film of 3 mg was formed.

The $SiO_x$ thin film thus obtained was subjected to the X-ray fluorescence spectroscopy in the same manner as in Example for determination of a value x. As a result, the value x was 0.1.

Further, the $SiO_x$ thin film thus obtained was subjected to the X-ray diffractometry in the same manner as in Example 1. From the obtained X-ray diffraction pattern, the production of the negative electrode active material including a silicon oxide having an amorphous structure was verified.

Furthermore, the $SiO_x$ thin film thus obtained was observed with a transmission electron microscope in the same manner as in Example 1. In the obtained transmission electron microscopic image, crystallite of 2 nm or more in size was not observed, and moreover, the diffraction ring had a hollow pattern. From these results, the formation of a homogeneous amorphous structure in the resultant $SiO_x$ thin film was verified.

Moreover, the $Si_{2p}$ binding energy was measured with the X-ray photoelectron spectroscopy in the same manner as in Example 1. The result is shown in FIG. 9. Three separate peaks of $Si_{2p}$ binding energy were obtained in the range of 100 eV to 102 eV. Respective peaks were attributed to Si(0), Si(1), and Si(2) from the low energy side. From the area ration of these, the following relations were obtained as show in FIG. 9.

$$\frac{NSi(0)}{\sum NSi(n)} = 0.769 > 0.1 \qquad \text{[Formula 6]}$$

$$\frac{Nsi(4)}{\sum NSi(n)} = 0 < 0.1$$

$$Nsi(1) + NSi(2) + Nsi(3) = 23.1 \neq 0$$

A coin-type battery was fabricated in the same manner as in Example 1 with the use of the foregoing negative electrode active material and measured for a charge-discharge capacity in the same manner as in Example 1. The obtained charge-discharge characteristics are shown in FIG. 10, and the obtained charge-discharge cycle characteristics are shown in FIG. 11.

From FIG. 11, the coin-type battery of this example demonstrated a capacity as high as about 10 mAh in the initial state. Even after the passage of 200 cycles, the capacity was maintained at about 6.4 mAh, which was 60% or more of the capacity in the initial state. It was found therefore that the coin-type battery of this example had excellent charge-discharge cycle characteristics. Further, from FIG. 10, the initial charge capacity, the discharge capacity, and the irreversible capacity were 10.8 mAh, 10 mAh, and 0.8 mAh, respectively, and the potential difference between the charge curve and the discharge curve was small. It was found therefore that the coin-type battery of this example was excellent in polarization characteristics as well as high-rate charge-discharge characteristics.

Moreover, the $O_{1s}$ binding energy was measured with X-ray photoelectron spectroscopy before charge and discharge and after one cycle of charge and discharge in the same manner as in Example 1. As a result, it was observed that the $O_{1s}$ binding energy attributed to bridging oxygen atoms before charge had a peak at 532 eV. It was found, however, after discharge in which the battery experienced one cycle of charge and discharge, the peak shifted to 530 eV because of the influence of non-bridging oxygen atoms resulted from the formation of Si—O—Li. This means that the irreversible capacity is based on the formation of Si—O—Li.

Example 3

The negative electrode active material of the present invention was prepared in the same manner as in Example 1 except that the flow rate of oxygen gas introduced into the vacuum chamber was set at 80 sccm and a thin film of 2.2 mg was formed.

The $SiO_x$ thin film thus obtained was subjected to the X-ray fluorescence spectroscopy in the same manner as in Example 1 for determination of a value x. As a result, the value x was 1.2.

Further, the $SiO_x$ thin film thus obtained was subjected to the X-ray diffractometry in the same manner as in Example 1. From the obtained X-ray diffraction pattern, the production of the negative electrode active material including a silicon oxide having an amorphous structure was verified.

Furthermore, the $SiO_x$ thin film thus obtained was observed with a transmission electron microscope in the same manner as in Example 1. In the obtained transmission electron microscopic image, crystallite of 2 nm or more in size was not observed, and moreover, the diffraction ring had a hollow pattern. From these results, the formation of a homogeneous amorphous structure in the resultant $SiO_x$ thin film was verified.

Moreover, the $Si_{2p}$ binding energy was measured with the X-ray photoelectron spectroscopy in the same manner as in Example 1. The result is shown in FIG. 12. Five separate peaks of $Si_{2p}$ binding energy were obtained in the range of 98 eV to 106 eV. Respective peaks were attributed to Si(0), Si(1), Si(2), Si(3) and Si(4) from the low energy side, and the area ratio of these calculated assuming that the total sum was 100 was 11.9:1.8:34.7:48.3:3.3. Accordingly, the following relations were obtained.

$$\frac{NSi(0)}{\sum NSi(n)} = 0.119 > 0.1 \qquad \text{[Formula 7]}$$

$$\frac{Nsi(4)}{\sum NSi(n)} = 0.033 < 0.1$$

$$Nsi(1) + NSi(2) + Nsi(3) = 84.8 \neq 0$$

A coin-type battery was fabricated in the same manner as in Example 1 with the use of the foregoing negative electrode active material and measured for a charge-discharge capacity in the same manner as in Example 1. The obtained charge-discharge characteristics are shown in FIG. 13, and the obtained charge-discharge cycle characteristics are shown in FIG. 14.

From FIG. 14, the coin-type battery of this example demonstrated a capacity of about 2 mAh in the initial state. Even after the passage of 200 cycles, the capacity was still 70% or more of the capacity in the initial state. It was found therefore that the coin-type battery of this example had excellent charge-discharge cycle characteristics. Further, from FIG. 13, the initial charge capacity, the discharge capacity, and the irreversible capacity were 5 mAh, 2 mAh, and 3 mAh, respectively, showing that the irreversible capacity was large, and the potential difference between the charge curve and the discharge curve was great. It was found therefore that the coin-type battery of this example was inferior in polarization characteristics. This was presumably because the large content of oxygen in the $SiO_x$ thin film caused the resistance of the electrode plate to increase. The initial capacity was low because, since the film formation was performed in such a manner that a constant thickness was obtained, the content of Si in the $SiO_x$ thin film was reduced.

Moreover, the $O_{1s}$ binding energy was measured with X-ray photoelectron spectroscopy before charge and discharge and after one cycle of charge and discharge in the same manner as in Example 1. As a result, it was observed that the $O_{1s}$ binding energy attributed to bridging oxygen atoms before charge had a peak at 532 eV. It was found, however, after discharge in which the battery experienced one cycle of charge and discharge, the peak shifted to 530 eV because of the influence of non-bridging oxygen atoms resulted from the formation of Si—O—Li. This means that the irreversible capacity is based on the formation of Si—O—Li.

Comparative Example 1

A negative electrode active material of Comparative Example 1 was prepared in the same manner as in Example 1 except that an Ar gas was introduced into the vacuum chamber at a flow rate of 80 sccm in place of the oxygen gas, and a thin film of 3.1 mg was formed.

The $SiO_x$ thin film thus obtained was subjected to the X-ray fluorescence spectroscopy in the same manner as in Example 1. It was verified from the result which was below the detection limit that a Si thin film was formed.

Further, the $Si_{2p}$ binding energy was measured with the X-ray photoelectron spectroscopy in the same manner as in Example 1. The result is shown in FIG. 15. Only one peak of $Si_{2p}$ binding energy was obtained at 99.8 eV. This peak was attributed to Si(0), and accordingly the following relations were obtained. In other words, there existed no energy attributed to intermediate bonds connecting Si(0) and Si(4).

$$\frac{NSi(0)}{\sum NSi(n)} = 1 > 0.1 \qquad \text{[Formula 8]}$$

$$\frac{Nsi(4)}{\sum NSi(n)} = 0 < 0.1$$

$$Nsi(1) + NSi(2) + Nsi(3) = 0$$

A coin-type battery was fabricated in the same manner as in Example 1 with the use of the foregoing negative electrode active material and measured for a charge-discharge capacity in the same manner as in Example 1. The obtained charge-discharge characteristics are shown in FIG. 16, and the obtained charge-discharge cycle characteristics are shown in FIG. 17.

From FIG. 17, the coin-type battery of this comparative example demonstrated a capacity as high as about 12 mAh in the initial state. However, after the passage of 200 cycles, the capacity was significantly reduced, indicating a significant deterioration in the charge-discharge cycle characteristics.

The battery was disassembled, and a rupture of the negative electrode together with the copper foil serving as the current collector was observed. This presumably occurred because the current collector failed to follow the expansion in volume occurring during charge and discharge of the negative electrode active material.

Comparative Example 2

A negative electrode active material of Comparative Example 2 was prepared in the same manner as in Example 1 except that the flow rate of oxygen gas was set at 90 sccm and a thin film of 3.5 mg was formed.

The $SiO_x$ thin film thus obtained was subjected to the X-ray fluorescence spectroscopy in the same manner as in Example 1 for determination of a value x. As a result, the value x was 1.5.

Further, the $Si_{2p}$ binding energy was measured with the X-ray photoelectron spectroscopy in the same manner as in Example 1. The result is shown in FIG. 18. Five separate peaks of $Si_{2p}$ binding energy were obtained in the range of 98 eV to 106 eV. These peaks were attributed to Si(0), Si(1), Si(2), Si(3) and Si(4) from the low energy side, and the area ratio of these calculated assuming that the total sum was 100 was 3.9:8.2:18:29:42. Accordingly, the following relations were obtained.

$$\frac{NSi(0)}{\sum NSi(n)} = 0.039 < 0.1 \qquad \text{[Formula 9]}$$

$$\frac{Nsi(4)}{\sum NSi(n)} = 0.42 > 0.1$$

$$Nsi(1) + NSi(2) + Nsi(3) = 55.2$$

A coin-type battery was fabricated in the same manner as in Example 1 with the use of the foregoing negative electrode active material and measured for a charge-discharge capacity in the same manner as in Example 1. The obtained charge-discharge characteristics are shown in FIG. 19, and the obtained charge-discharge cycle characteristics are shown in FIG. 20.

From FIG. 20, the coin-type battery of this comparative example demonstrated a capacity of about 2 mAh in the initial state. Even after the passage of 200 cycles, the capacity was still 50% or more of the capacity in the initial state. It was found however that high capacity feature of a silicon compound was not obtained because of the significantly low initial capacity and capacity retention rate.

Comparative Example 3

A $SiO_2$ powder and a Si powder were mixed in a molar ratio of 3:7. To 90 parts by weight of the resultant mixture, 5 parts by weight of acetylene black serving as a conductive agent and 5 parts by weight of polyvinylidene fluoride were added, and then N-methylpyrrolidone was added to prepare a paste. The paste thus prepared was applied on one face of a 35-μm thick copper foil, dried and then rolled, followed by vacuum drying at 200° C. for 24 hours, whereby a paste-coated type electrode was fabricated.

The paste-coated type electrode thus prepared was subjected to the X-ray fluorescence spectroscopy in the same manner as in Example 1 for determination of a value x. As a result, the value x was 0.6.

Further, the $Si_{2p}$ binding energy was measured with the X-ray fluorescence spectroscopy in the same manner as described in Example 1. The result is shown in FIG. 21. Two separate peaks of $Si_{2p}$ binding energy were obtained at 99.5 eV and 103 eV. These peaks were attributed to Si(0) and Si(4) from the low energy side, and the following relation was obtained. In other words, there existed no energy attributed to intermediate bonds connecting Si(0) and Si(4).

$$NSi(1)+NSi(2)+NSi(3)=0 \quad \text{[Formula 10]}$$

A coin-type battery was fabricated in the same manner as in Example 1 with the use of the foregoing paste-coated type electrode and measured for a charge-discharge capacity in the same manner as in Example 1. The obtained charge-discharge characteristics are shown in FIG. 22, and the obtained charge-discharge cycle characteristics are shown in FIG. 23.

From FIG. 23, the coin-type battery of this comparative example cannot be designed to have a high charge-discharge capacity because of a high degree of polarization thereof. Moreover, the capacity was significantly reduced after repeated charge-discharge cycles. This was because since $SiO_2$ was a non-conductive material, the resistance of the negative electrode was increased. In addition, the Si particles to be involved in charge and discharge became finer as a result of repeated expansion and contraction during charge-discharge cycles, resulting in insufficient current collection.

Comparative Example 4

A negative electrode active material of Comparative Example 4 was prepared in the same manner as in Example 1 except that a polyimide plate having a thickness 5 mm was arranged between the substrate and the cooling plate to suppress heat radiation from the substrate.

The paste-coated type electrode thus obtained was subjected to the X-ray fluorescence spectroscopy in the same manner as in Example 1 for determination of a value x. As a result, the value x was 0.6.

Further, the $Si_{2p}$ binding energy was measured with the X-ray photoelectron spectroscopy in the same manner as in Example 1. The result is shown in FIG. 24. Five separate peaks of $Si_{2p}$ binding energy were obtained in the range of 98 eV to 106 eV. These peaks are attributed to Si(0), Si(1), Si(2), Si(3) and Si(4) from the low energy side, and the area ratio of these calculated assuming that the total sum was 100 was 45.2:12.4:13.3:0.8:28.3. Accordingly, the following relations were obtained.

$$\frac{NSi(0)}{\sum NSi(n)} = 0.45 > 0.1 \quad \text{[Formula 11]}$$

$$\frac{Nsi(4)}{\sum NSi(n)} = 0.28 > 0.1$$

$$Nsi(1) + NSi(2) + Nsi(3) = 26.5 \neq 0$$

A coin-type battery was fabricated in the same manner as in Example 1 with the use of the foregoing negative electrode active material and measured for a charge-discharge capacity in the same manner as in Example 1. The obtained charge-discharge characteristics are shown in FIG. 25, and the obtained charge-discharge cycle characteristics are shown in FIG. 26.

From FIG. 26, the coin-type battery of this comparative example cannot be designed to have a high charge-discharge capacity because of a high degree of polarization thereof. Moreover, the capacity was significantly reduced after repeated charge-discharge cycles. This was because since $SiO_2$ was a non-conductive material, the resistance of the negative electrode was increased. In addition, the Si particles to be involved in charge and discharge became finer as a result of repeated expansion and contraction during charge-discharge cycles, resulting in insufficient current collection.

Comparative Example 5

A negative electrode active material was prepared in the manner as described below with a pressure in the vacuum chamber set at 0.005 Pa and without an oxygen gas introduced thereinto.

First, 17.85 g of powder obtained by crushing monocrystalline (100) silicon wafer in argon atmosphere, 16.25 g of amorphous SiO powder, and 10.9 g of amorphous $SiO_2$ powder were weighed and mixed sufficiently (charged material composition: $SiO_{0.6}$). Thereafter, the resultant mixture was molded under pressure to yield a vapor deposition source.

This vapor deposition source was placed in a carbon crucible and was irradiated with electron beams from an electron gun under the conditions of an EB voltage of −9 kV and an EB current of 400 mA, so that the vapor deposition source was melted to be vapor-deposited on a copper foil.

However, the splashing occurred to such a degree that a film cannot be formed. The vacuum chamber was then opened to check the inside of the carbon crucible. As a result, a gold mass and a vitreous mass were observed. There was observed a small amount of brown powder, too, which was assumed to be of SiO, but the amount of the brown powder was significantly smaller than the total amount as originally charged. Furthermore, the substrate had an extremely rough surface, which could not be used for subsequent analyses.

This was presumably because: the vapor pressures of the powder obtained by crushing silicon wafer, the amorphous SiO powder, and the amorphous $SiO_2$ powder are significantly different from one another; $SiO_2$ easily becomes electrically charged; and SiO has a sublimating property. FIG. 27 shows vapor pressure curves of the silicon, the silicon monoxide, and the silicon dioxide.

Comparative Example 6

5 parts by weight of acetylene black serving as a conductive agent and 5 parts by weight of polyvinylidene fluoride were added to 90 parts by weight of commercially available SiO (special-class grade product available from Furuuchi Chemical Corporation, purity: 99.99%), and then N-methylpyrrolidone was added to prepare a paste. The paste thus prepared was applied on one face of a 35-μm thick copper foil, dried and then rolled, followed by vacuum drying at 200° C. for 24 hours, whereby a paste-coated type electrode was fabricated.

The $Si_{2p}$ binding energy was measured with the X-ray photoelectron spectroscopy in the same manner as described in Example 1. The result is shown in FIG. 30. Two separate peaks of $Si_{2p}$ binding energy were obtained at 98 eV to 106 eV. These peaks were attributed to Si(0) and Si(4) from the low energy side, and the area ratio of these calculated, assuming that the total sum was 100, was 31:69. Accordingly, the following relations were obtained.

[Formula 12]
$$\frac{NSi(0)}{\sum NSi(n)} = 0.31 > 0.1$$

$$\frac{Nsi(4)}{\sum NSi(n)} = 0.69 > 0.1$$

$$Nsi(1) + NSi(2) + Nsi(3) = 0$$

A coin-type battery was fabricated in the same manner as in Example 1 with the use of the foregoing paste-coated type electrode and measured for a charge-discharge capacity in the same manner as in Example 1. The obtained charge-discharge cycle characteristics are shown in FIG. 31. From FIG. 31, the coin-type battery of this comparative example demonstrated a high degree of polarization because of the large content of Si(4). Moreover, since Si(1), Si(2) and Si(3) were not present, a strong structure against variations in volume in which Si(0) and these were continuously bonded was not formed, resulted in a significant deterioration in cycle characteristics.

INDUSTRIAL APPLICABILITY

The negative electrode for a lithium ion secondary battery according to the present invention can provide a negative electrode active material capable of exerting excellent charge-discharge cycle characteristics while maintaining a high charge-discharge efficiency of a battery using the same and a high charge-discharge capacity which is a feature of a silicon active material.

The invention claimed is:

1. A method for producing a negative electrode active material for a lithium ion secondary battery, the method comprising steps of:
   melting silicon to give molten silicon; and
   evaporating said molten silicon as a sole silicon source into an oxygen atmosphere and depositing said evaporated silicon on a substrate having a temperature lower than an ambient temperature to give a negative electrode active material including a silicon oxide that is represented by $SiO_x$ where $0.1 \leq x \leq 1.2$ and has structural units each in the form of a tetrahedron in which a silicon atom is located at its center and silicon or oxygen atoms are located at its four vertices, said structural units being arranged randomly to form an amorphous structure.

2. The method in accordance with claim 1, wherein said structural units are totally and uniformly dispersed in the negative electrode active material.

3. A negative electrode active material for a lithium ion secondary battery, the active material consisting essentially of:
   silicon oxide that has structural units each in the form of a tetrahedron in which a silicon atom is located at the center of each unit and silicon or oxygen atoms are located at four vertices of the each unit, said structural units being arranged randomly to form an amorphous structure, wherein:
   said structural units are totally and uniformly dispersed in the negative electrode active material,
   in the case that the number of oxygen atoms located at said four vertices in said structural units is represented by n, where n=0, 1, 2, 3 or 4, and said structural units are represented by Si(n), and
   the number of said structural units NSi(n) in said silicon oxide satisfies the following relations (1) to (3) and (6):

[Formula 1]
$$\frac{NSi(0)}{\sum NSi(n)} \geq 0.1, \tag{1}$$

$$\frac{NSi(4)}{\sum NSi(n)} \leq 0.1, \tag{2}$$

$$NSi(1) + NSi(2) + NSi(3) \neq 0, \text{ and} \tag{3}$$

$$0.231 \leq \frac{NSi(1) + NSi(2) + NSi(3)}{\sum NSi(n)} < 1. \tag{6}$$

4. The negative electrode active material for a lithium ion secondary battery in accordance with claim 3, wherein said silicon oxide is represented by $SiO_x$ where $0.1 \leq x \leq 0.6$.

5. The negative electrode active material for a lithium ion secondary battery in accordance with claim 3, wherein in an X-ray photoelectron spectroscopy using Al-Kα ray of said silicon oxide in said negative electrode active material having been subjected to charge and discharge at least once, a peak of $O_{1s}$ energy is observed at 530±1 eV.

6. A negative electrode for a lithium ion secondary battery comprising the negative electrode active material for a lithium ion secondary battery in accordance with claim 3.

7. A lithium ion secondary battery comprising:
   a positive electrode capable of absorbing and desorbing lithium ions,
   the negative electrode in accordance with claim 6,
   a separator interposed between said positive electrode and said negative electrode, and
   an electrolyte with lithium ion conductivity.

8. The negative electrode active material for a lithium ion secondary battery in accordance with claim 3, wherein the negative electrode active material is prepared by a method comprising steps of:
   melting silicon to give molten silicon; and
   evaporating said molten silicon as a sole silicon source in oxygen atmosphere and depositing said evaporated silicon on a substrate having a temperature lower than an ambient temperature.

* * * * *